(12) United States Patent
Lim et al.

(10) Patent No.: US 10,719,435 B2
(45) Date of Patent: Jul. 21, 2020

(54) STORAGE DEVICE SUPPORTING MULTIPLE COMMUNICATION TYPES AND OPERATING METHOD THEREOF

(71) Applicant: SAMSUNG ELECTRONICS CO., LTD., Suwon-si (KR)

(72) Inventors: Gwangman Lim, Seoul (KR); Eun-Jin Yun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 259 days.

(21) Appl. No.: 15/863,218

(22) Filed: Jan. 5, 2018

(65) Prior Publication Data
US 2018/0239696 A1 Aug. 23, 2018

(30) Foreign Application Priority Data

Feb. 17, 2017 (KR) ........................ 10-2017-0021872

(51) Int. Cl.
*G06F 13/00* (2006.01)
*G06F 12/02* (2006.01)
(Continued)

(52) U.S. Cl.
CPC ........ *G06F 12/0238* (2013.01); *G06F 3/0625* (2013.01); *G06F 3/0635* (2013.01); *G06F 3/0679* (2013.01); *G06F 12/0246* (2013.01); *G06F 13/387* (2013.01); *G06F 13/4081* (2013.01); *G06F 13/4282* (2013.01); *G06F 2212/202* (2013.01);
(Continued)

(58) Field of Classification Search
None
See application file for complete search history.

(56) References Cited

U.S. PATENT DOCUMENTS 6,288,911 B1  9/2001 Aoki et al.
7,517,231 B2  4/2009 Hiew et al.
(Continued)

OTHER PUBLICATIONS

US 9,514,082 B2, 12/2016, Shin et al. (withdrawn)
(Continued)

*Primary Examiner* — Henry Tsai
*Assistant Examiner* — Dean Phan
(74) *Attorney, Agent, or Firm* — Sughrue Mion, PLLC

(57) ABSTRACT

A storage device includes nonvolatile memory devices, a connector that includes connection terminals, and a controller that communicates with an external host device through the connector and to control the nonvolatile memory devices. The connector provides the external host device with detection information in response to the connector being connected with the external host device. Power is supplied from the external host device to the controller and the nonvolatile memory devices through the connector in response to the providing of the detection information. The connector provides the external host device with information of a communication type in which the controller communicates with the external host device, after the power is supplied. The communication type is one of a first communication type and a second communication type. The controller configures the connection terminals to correspond to a single or dual port based on a signal received from the external host device.

20 Claims, 24 Drawing Sheets

(51) Int. Cl.
*G06F 13/40* (2006.01)
*G06F 13/42* (2006.01)
*G06F 13/38* (2006.01)
*G06F 3/06* (2006.01)

(52) U.S. Cl.
CPC ...... *G06F 2213/0026* (2013.01); *Y02D 10/14* (2018.01); *Y02D 10/151* (2018.01)

(56) References Cited

U.S. PATENT DOCUMENTS

| | | | |
|---|---|---|---|
| 7,565,457 B2 | 7/2009 | Ooi et al. | |
| 8,423,695 B2 | 4/2013 | Purwin | |
| 8,886,864 B1 | 11/2014 | Sung et al. | |
| 9,235,542 B2 | 1/2016 | Liu et al. | |
| 9,501,110 B2 | 11/2016 | Heyd et al. | |
| 9,519,318 B2 | 12/2016 | Davis et al. | |
| 2006/0161717 A1 | 7/2006 | Purwin | |
| 2008/0001480 A1 | 1/2008 | Ooi et al. | |
| 2008/0040358 A1* | 2/2008 | Deng | G06F 3/0607 |
| 2008/0089020 A1 | 4/2008 | Hiew et al. | |
| 2014/0223070 A1 | 8/2014 | Liu et al. | |
| 2015/0186317 A1* | 7/2015 | Kaufmann | G06F 13/4027 710/306 |
| 2015/0355686 A1 | 12/2015 | Heyd et al. | |
| 2015/0356040 A1 | 12/2015 | Shin et al. | |
| 2015/0362965 A1 | 12/2015 | Davis et al. | |
| 2016/0062652 A1* | 3/2016 | Hia | G06F 12/0246 711/102 |
| 2016/0226244 A1* | 8/2016 | Tomida | H02J 7/0052 |
| 2016/0259394 A1 | 9/2016 | Ragavan | |
| 2016/0378166 A1 | 12/2016 | Zhong et al. | |
| 2018/0032469 A1* | 2/2018 | Olarig | G06F 13/4234 |

OTHER PUBLICATIONS

PCI Sig, PCI Express M.2 Specification, Nov. 1, 2013, Revision 1.0, p. 1-201 (Year: 2013).*

PCI Express M.2 Specification, Revision 1.1, Jan. 15, 2016, PCI-SIG, PCI Express, 240 Pages Total.

* cited by examiner

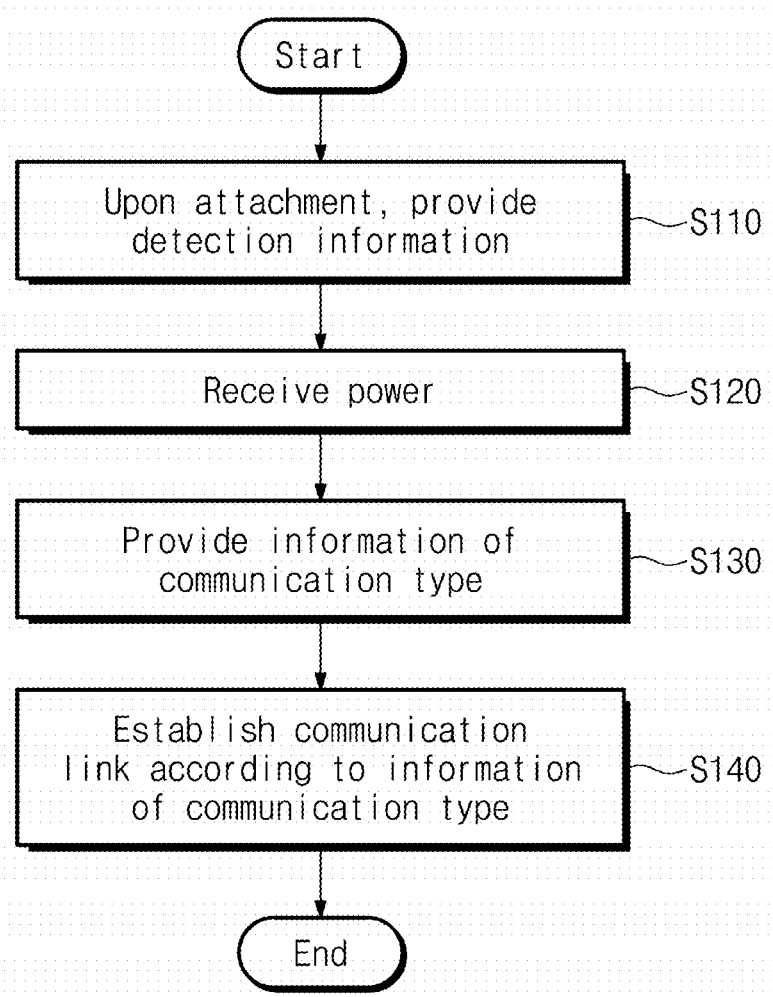

FIG. 3

| | | | |
|---|---|---|---|
| 74 | N/C(or 3.3V) | 75 | GND |
| 72 | N/C(or 3.3V) | 73 | GND |
| 70 | N/C(or 3.3V) | 71 | GND |
| 68 | SUSCLK(32kHz) | 69 | PEDET \| N/C |
| 66 | KEY | 67 | |
| 64 | KEY | 65 | KEY |
| 62 | KEY | 63 | KEY |
| 60 | KEY | 61 | KEY |
| 58 | Reserved MFG_CLOCK | 59 | KEY |
| 56 | Reserved MFG_DATA | 57 | GND |
| 54 | N/C \| PEWAKE# | 55 | N/C \| REFCLKp |
| 52 | N/C \| CLKREQ# | 53 | N/C \| REFCLKn |
| 50 | N/C \| PERST#0 | 51 | GND |
| 48 | | 49 | SATA-A+ \| PERp0 |
| 46 | | 47 | SATA-A- \| PERn0 |
| 44 | N/C \| ALERT#(0) | 45 | GND |
| 42 | SMB_DATA(I/O)(0/1.8V) | 43 | SATA-B+ \| PETp0 |
| 40 | SMB_CLK(I/O)(0/1.8V) | 41 | SATA-B- \| PETn0 |
| 38 | DEVSLP/PWDIS \| NC | 39 | GND |
| 36 | | 37 | N/C \| PERp1 |
| 34 | | 35 | N/C \| PERn1 |
| 32 | | 33 | GND |
| 30 | | 31 | N/C \| PETp1 |
| 28 | | 29 | N/C \| PETn1 |
| 26 | | 27 | GND |
| 24 | | 25 | N/C \| PERp2 |
| 22 | | 23 | N/C \| PERn2 |
| 20 | | 21 | GND |
| 18 | N/C(or 3.3V) | 19 | N/C \| PETp2 |
| 16 | N/C(or 3.3V) | 17 | N/C \| PETn2 |
| 14 | N/C(or 3.3V) | 15 | GND |
| 12 | 3.3V | 13 | N/C \| PERp3 |
| 10 | DAS/DSS#(I/O) \| LED1# | 11 | N/C \| PERn3 |
| 8 | | 9 | GND |
| 6 | | 7 | N/C \| PETp3 |
| 4 | N/C(or 3.3V) | 5 | N/C \| PETn3 |
| 2 | N/C(or 3.3V) | 3 | GND |
| | | 1 | GND |

FIG. 4

| | | | |
|---|---|---|---|
| | | 75 | GND |
| 74 | N/C(or 3.3V) | 73 | GND |
| 72 | N/C(or 3.3V) | 71 | GND |
| 70 | N/C(or 3.3V) | 69 | PEDET \| N/C |
| 68 | SUSCLK(32kHz) | 67 | PRSNT1# |
| 66 | KEY | 65 | KEY |
| 64 | KEY | 63 | KEY |
| 62 | KEY | 61 | KEY |
| 60 | KEY | 59 | KEY |
| 58 | Reserved MFG_CLOCK | 57 | GND |
| 56 | Reserved MFG_DATA | 55 | N/C \| REFCLKp |
| 54 | N/C \| REWAKE# | 53 | N/C \| REFCLKn |
| 52 | N/C \| CLKREQ# | 51 | GND |
| 50 | N/C \| PERST#0 | 49 | SATA-A+ \| PERp0 |
| 48 | | 47 | SATA-A- \| PERn0 |
| 46 | | 45 | GND |
| 44 | N/C \| ALERT#(0) | 43 | SATA-B+ \| PETp0 |
| 42 | SMB_DATA(I/O)(O/1.8V) | 41 | SATA-B- \| PETn0 |
| 40 | SMB_CLK(I/O)(O/1.8V) | 39 | GND |
| 38 | DEVSLP/PWDIS \| NC | 37 | N/C \| PERp1 |
| 36 | | 35 | N/C \| PERn1 |
| 34 | | 33 | GND |
| 32 | | 31 | N/C \| PETp1 |
| 30 | | 29 | N/C \| PETn1 |
| 28 | | 27 | GND |
| 26 | | 25 | N/C \| PERp2 |
| 24 | | 23 | N/C \| PERn2 |
| 22 | | 21 | GND |
| 20 | | 19 | N/C \| PETp2 |
| 18 | N/C(or 3.3V) | 17 | N/C \| PETn2 |
| 16 | N/C(or 3.3V) | 15 | GND |
| 14 | N/C(or 3.3V) | 13 | N/C \| PERp3 |
| 12 | 3.3V | 11 | N/C \| PERn3 |
| 10 | DAS/DSS#(I/O) \| LED1# | 9 | GND |
| 8 | | 7 | N/C \| PETp3 |
| 6 | PRSNT2# | 5 | N/C \| PETn3 |
| 4 | N/C(or 3.3V) | 3 | GND |
| 2 | N/C(or 3.3V) | 1 | GND |

FIG. 6

| | | | |
|---|---|---|---|
| 74 | N/C(or 3.3V) | 75 | GND |
| 72 | N/C(or 3.3V) | 73 | GND |
| 70 | N/C(or 3.3V) | 71 | GND |
| 68 | SUSCLK(32kHz) | 69 | PEDET / N/C |
| 66 | KEY | 67 | |
| 64 | KEY | 65 | KEY |
| 62 | KEY | 63 | KEY |
| 60 | KEY | 61 | KEY |
| | | 59 | KEY |
| 58 | Reserved MFG_CLOCK | 57 | GND |
| 56 | Reserved MFG_DATA | 55 | N/C / REFCLKp |
| 54 | N/C / PEWAKE# | 53 | N/C / REFCLKn |
| 52 | N/C / CLKREQ# | 51 | GND |
| 50 | N/C / PERST#0 | 49 | SATA-A+ / PERp0 |
| 48 | | 47 | SATA-A- / PERn0 |
| 46 | | 45 | GND |
| 44 | N/C / ALERT#(0) | 43 | SATA-B+ / PETp0 |
| 42 | SMB_DATA(I/O)(0/1.8V) | 41 | SATA-B- / PETn0 |
| 40 | SMB_CLK(I/O)(0/1.8V) | 39 | GND |
| 38 | DEVSLP/PWDIS / NC | 37 | N/C / PERp1 |
| 36 | 12V (Pre-Charge)(or N/C) | 35 | N/C / PERn1 |
| 34 | 12V(or N/C) | 33 | GND |
| 32 | 12V(or N/C) | 31 | N/C / PETp1 |
| 30 | 12V(or N/C) | 29 | N/C / PETn1 |
| 28 | | 27 | GND |
| 26 | GND(or N/C) | 25 | N/C / PERp2 |
| 24 | | 23 | N/C / PERn2 |
| 22 | | 21 | GND |
| 20 | GND(or N/C) | 19 | N/C / PETp2 |
| 18 | N/C(or 3.3V) | 17 | N/C / PETn2 |
| 16 | N/C(or 3.3V) | 15 | GND |
| 14 | N/C(or 3.3V) | 13 | N/C / PERp3 |
| 12 | 3.3V | 11 | N/C / PERn3 |
| 10 | DAS/DSS#(I/O) / LED1# | 9 | GND |
| 8 | | 7 | N/C / PETp3 |
| 6 | | 5 | N/C / PETn3 |
| 4 | N/C(or 3.3V) | 3 | GND |
| 2 | N/C(or 3.3V) | 1 | GND |

FIG. 11

| | | | | |
|---|---|---|---|---|
| 74 | N/C(or 3.3V) | | 75 | GND |
| 74 | N/C(or 3.3V) | | 73 | GND |
| 72 | N/C(or 3.3V) | | 71 | GND |
| 70 | N/C(or 3.3V) | | 69 | PEDET | NC |
| 68 | SUSCLK(32kHz) | | 67 | |
| 66 | (KEY) | | 65 | (KEY) |
| 64 | (KEY) | | 63 | (KEY) |
| 62 | (KEY) | | 61 | (KEY) |
| 60 | (KEY) | | 59 | (KEY) |
| 58 | Reserved MFG_CLOCK | | 57 | GND |
| 56 | Reserved MFG_DATA | | 55 | N/C | REFCLKp |
| 54 | N/C | PEWAKE# | 53 | N/C | REFCLKn |
| 52 | N/C | CLKREQ# | 51 | GND |
| 50 | N/C | PERST#0 | 49 | SATA-A+ | PERp0 |
| 48 | N/C | PERST#1 | 47 | SATA-A- | PERn0 |
| 46 | N/C | DualPortEn# | 45 | GND |
| 44 | N/C | ALERT#(0) | 43 | SATA-B+ | PETp0 |
| 42 | SMB_DATA(I/O)(0/1.8V) | | 41 | SATA-B- | PETn0 |
| 40 | SMB_CLK(I/O)(0/1.8V) | | 39 | GND |
| 38 | DEVSLP/PWDIS | NC | 37 | N/C | PERp1 |
| 36 | | | 35 | N/C | PERn1 |
| 34 | | | 33 | GND |
| 32 | | | 31 | N/C | PETp1 |
| 30 | | | 29 | N/C | PETn1 |
| 28 | | | 27 | GND |
| 26 | | | 25 | N/C | PERp2 |
| 24 | N/C | REFCLKp1 | 23 | N/C | PERn2 |
| 22 | N/C | REFCLKn1 | 21 | GND |
| 20 | | | 19 | N/C | PETp2 |
| 18 | N/C(or 3.3V) | | 17 | N/C | PETn2 |
| 16 | N/C(or 3.3V) | | 15 | GND |
| 14 | N/C(or 3.3V) | | 13 | N/C | PERp3 |
| 12 | 3.3V | | 11 | N/C | PERn3 |
| 10 | DAS/DSS#(I/O) | LED1# | 9 | GND |
| 8 | | | 7 | N/C | PETp3 |
| 6 | | | 5 | N/C | PETn3 |
| 4 | N/C(or 3.3V) | | 3 | GND |
| 2 | N/C(or 3.3V) | | 1 | GND |

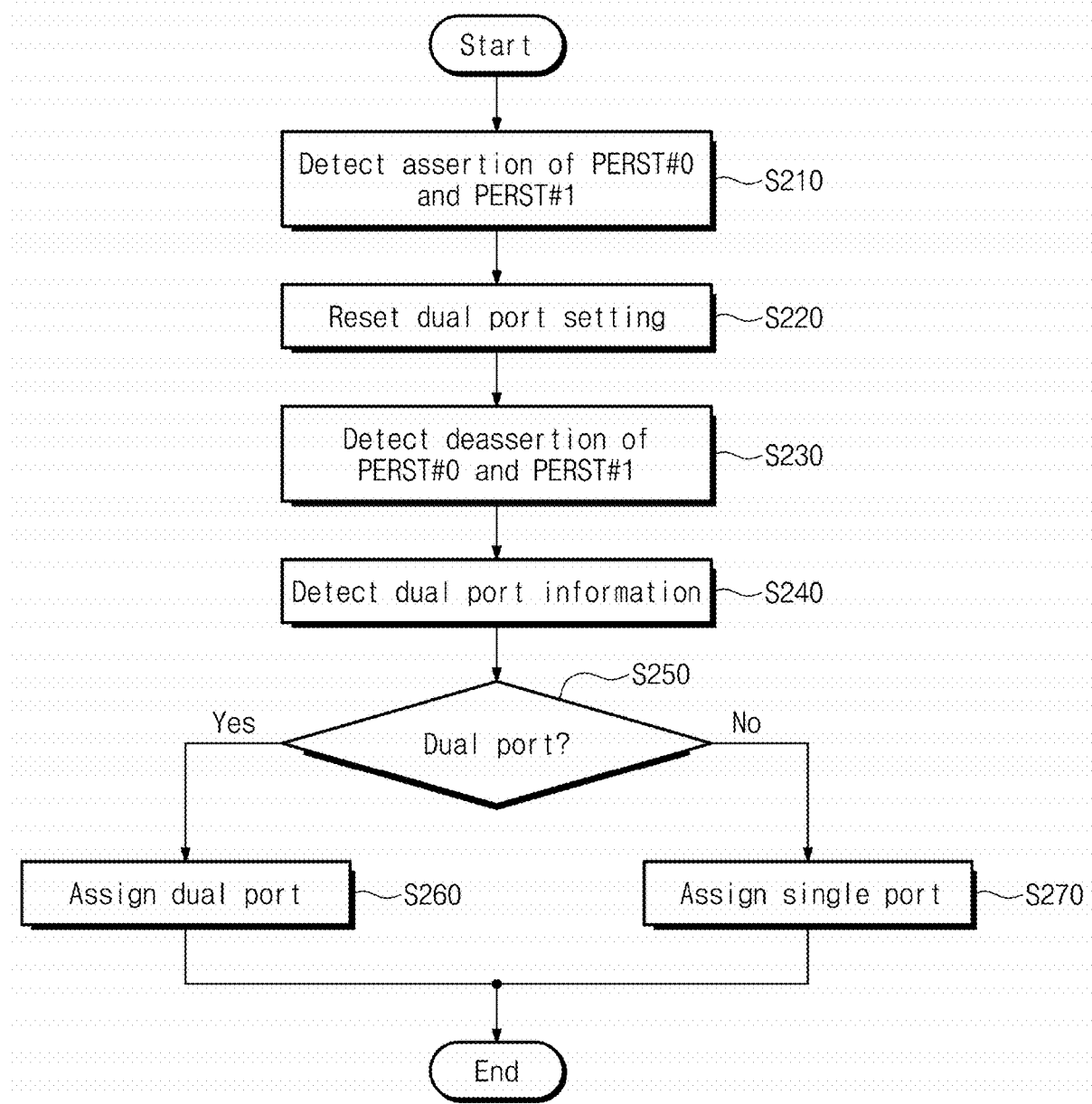

FIG. 14

| | | | | |
|---|---|---|---|---|
| 74 | N/C(or 3.3V) | | 75 | GND |
| 74 | N/C(or 3.3V) | | 73 | GND |
| 72 | N/C(or 3.3V) | | 71 | GND |
| 70 | N/C(or 3.3V) | | 69 | PEDET | NC |
| 68 | SUSCLK(32kHz) | | 67 | |
| 66 | | | 65 | |
| 64 | KEY | | 63 | KEY |
| 62 | | | 61 | |
| 60 | | | 59 | |
| 58 | Reserved MFG_CLOCK | | 57 | GND |
| 56 | Reserved MFG_DATA | | 55 | N/C | REFCLKp |
| 54 | N/C | PEWAKE# | 53 | N/C | REFCLKn |
| 52 | N/C | CLKREQ# | 51 | GND |
| 50 | N/C | PERST#0 | 49 | SATA-A+ | PERp0 |
| 48 | | | 47 | SATA-A- | PERn0 |
| 46 | | | 45 | GND |
| 44 | N/C | ALERT#(0) | 43 | SATA-B+ | PETp0 |
| 42 | SMB_DATA(I/O)(0/1.8V) | | 41 | SATA-B- | PETn0 |
| 40 | SMB_CLK(I/O)(0/1.8V) | | 39 | GND |
| 38 | DEVSLP/PWDIS | NC | 37 | N/C | PERp1 |
| 36 | | | 35 | N/C | PERn1 |
| 34 | | | 33 | GND |
| 32 | | | 31 | N/C | PETp1 |
| 30 | | | 29 | N/C | PETn1 |
| 28 | N/C | PWDIS | 27 | GND |
| 26 | | | 25 | N/C | PERp2 |
| 24 | | | 23 | N/C | PERn2 |
| 22 | | | 21 | GND |
| 20 | | | 19 | N/C | PETp2 |
| 18 | N/C(or 3.3V) | | 17 | N/C | PETn2 |
| 16 | N/C(or 3.3V) | | 15 | GND |
| 14 | N/C(or 3.3V) | | 13 | N/C | PERp3 |
| 12 | 3.3V | | 11 | N/C | PERn3 |
| 10 | DAS/DSS#(I/O) | LED1# | 9 | GND |
| 8 | | | 7 | N/C | PETp3 |
| 6 | | | 5 | N/C | PETn3 |
| 4 | N/C(or 3.3V) | | 3 | GND |
| 2 | N/C(or 3.3V) | | 1 | GND |

FIG. 17

| | | | |
|---|---|---|---|
| 74 | N/C | 75 | GND |
| 72 | N/C | 73 | GND |
| 70 | N/C | 71 | GND |
| 68 | SUSCLK(32kHz) | 69 | PEDET |
| 66 | | 67 | PRSNT1# |
| 64 | KEY | 65 | |
| 62 | | 63 | KEY |
| 60 | | 61 | |
| | | 59 | |
| 58 | Reserved MFG_CLOCK | 57 | GND |
| 56 | Reserved MFG_DATA | 55 | N/C |
| 54 | N/C | 53 | N/C |
| 52 | N/C | 51 | GND |
| 50 | N/C | 49 | SATA-A+ |
| 48 | N/C | 47 | SATA-A- |
| 46 | N/C | 45 | GND |
| 44 | N/C | 43 | SATA B+ |
| 42 | SMB_DATA(I/O)(O/1.8V) | 41 | SATA-B |
| 40 | SMB_CLK(I/O)(O/1.8V) | 39 | GND |
| 38 | DEVSLP/PWDIS | 37 | N/C |
| 36 | 12V(Pre-Charge) | 35 | N/C |
| 34 | 12V | 33 | GND |
| 32 | 12V | 31 | N/C |
| 30 | 12V | 29 | N/C |
| 28 | N/C | 27 | GND |
| 26 | GND | 25 | N/C |
| 24 | N/C | 23 | N/C |
| 22 | N/C | 21 | GND |
| 20 | GND | 19 | N/C |
| 18 | N/C | 17 | N/C |
| 16 | N/C | 15 | GND |
| 14 | N/C | 13 | N/C |
| 12 | 3.3V | 11 | N/C |
| 10 | DAS/DSS#(I/O) | 9 | GND |
| 8 | N/C | 7 | N/C |
| 6 | PRSNT2# | 5 | N/C |
| 4 | N/C | 3 | GND |
| 2 | N/C | 1 | GND |

FIG. 18

| | | | |
|---|---|---|---|
| 74 | 3.3V | 75 | GND |
| 72 | 3.3V | 73 | GND |
| 70 | 3.3V | 71 | GND |
| 68 | SUSCLK(32kHz) | 69 | PEDET |
| | | 67 | PRSNT1# |
| 66 | | 65 | |
| 64 | | 63 | |
| 62 | | 61 | |
| 60 | | 59 | |
| 58 | Reserved MFG_CLOCK | 57 | GND |
| 56 | Reserved MFG_DATA | 55 | N/C |
| 54 | N/C | 53 | N/C |
| 52 | N/C | 51 | GND |
| 50 | N/C | 49 | SATA-A+ |
| 48 | N/C | 47 | SATA-A- |
| 46 | N/C | 45 | GND |
| 44 | N/C | 43 | SATA-B+ |
| 42 | SMB_DATA(I/O)(0/1.8V) | 41 | SATA-B- |
| 40 | SMB_CLK(I/O)(0/1.8V) | 39 | GND |
| 38 | DEVSLP/PWDIS | 37 | N/C |
| 36 | N/C | 35 | N/C |
| 34 | N/C | 33 | GND |
| 32 | N/C | 31 | N/C |
| 30 | N/C | 29 | N/C |
| 28 | N/C | 27 | GND |
| 26 | GND | 25 | N/C |
| 24 | N/C | 23 | N/C |
| 22 | N/C | 21 | GND |
| 20 | GND | 19 | N/C |
| 18 | 3.3V | 17 | N/C |
| 16 | 3.3V | 15 | GND |
| 14 | 3.3V | 13 | N/C |
| 12 | 3.3V | 11 | N/C |
| 10 | DAS/DSS#(I/O) | 9 | GND |
| 8 | N/C | 7 | N/C |
| 6 | PRSNT2# | 5 | N/C |
| 4 | 3.3V | 3 | GND |
| 2 | 3.3V | 1 | GND |

KEY: pins 60, 62, 64, 66 (left) and 59, 61, 63, 65 (right)

FIG. 19

| | | | |
|---|---|---|---|
| 74 | N/C | 75 | GND |
| 72 | N/C | 73 | GND |
| 70 | N/C | 71 | GND |
| 68 | SUSCLK(32kHz) | 69 | N/C |
| 66 | | 67 | PRSNT1# |
| 64 | | 65 | |
| 62 | | 63 | |
| 60 | | 61 | |
| 58 | Reserved MFG_CLOCK | 59 | |
| 56 | Reserved MFG_DATA | 57 | GND |
| 54 | PEWAKE# | 55 | REFCLKp |
| 52 | CLKREQ# | 53 | REFCLKn |
| 50 | PERST#0 | 51 | GND |
| 48 | PERST#1 | 49 | PERp0 |
| 46 | DualPortEn# | 47 | PERn0 |
| 44 | ALERT#(0) | 45 | GND |
| 42 | SMB_DATA(I/O)(0/1.8V) | 43 | PETp0 |
| 40 | SMB_CLK(I/O)(0/1.8V) | 41 | PETn0 |
| 38 | N/C | 39 | GND |
| 36 | 12V(Pre-Charge) | 37 | PERp1 |
| 34 | 12V | 35 | PERn1 |
| 32 | 12V | 33 | GND |
| 30 | 12V | 31 | PETp1 |
| 28 | PWDIS | 29 | PETn1 |
| 26 | GND | 27 | GND |
| 24 | N/C | 25 | PERp2 |
| 22 | N/C | 23 | PERn2 |
| 20 | GND | 21 | GND |
| 18 | N/C | 19 | PETp2 |
| 16 | N/C | 17 | PETn2 |
| 14 | N/C | 15 | GND |
| 12 | 3.3V | 13 | PERp3 |
| 10 | LED1# | 11 | PERn3 |
| 8 | N/C | 9 | GND |
| 6 | PRSNT2# | 7 | PETp3 |
| 4 | N/C | 5 | PETn3 |
| 2 | N/C | 3 | GND |
| | | 1 | GND |

KEY: 60, 62, 64, 66 / 59, 61, 63, 65

FIG. 20

| | | | |
|---|---|---|---|
| 74 | 3.3V | 75 | GND |
| 72 | 3.3V | 73 | GND |
| 70 | 3.3V | 71 | GND |
| 68 | SUSCLK(32kHz) | 69 | N/C |
| 66 | | 67 | PRSNT1# |
| 64 | KEY | 65 | |
| 62 | | 63 | KEY |
| 60 | | 61 | |
| 58 | Reserved MFG_CLOCK | 59 | |
| 56 | Reserved MFG_DATA | 57 | GND |
| 54 | PEWAKE# | 55 | REFCLKp |
| 52 | CLKREQ# | 53 | REFCLKn |
| 50 | PERST#0 | 51 | GND |
| 48 | PERST#1 | 49 | PERp0 |
| 46 | DualPortEn# | 47 | PERn0 |
| 44 | ALERT#(O) | 45 | GND |
| 42 | SMB_DATA(I/O)(O/1.8V) | 43 | PETp0 |
| 40 | SMB_CLK(I/O)(O/1.8V) | 41 | PETn0 |
| 38 | N/C | 39 | GND |
| 36 | N/C | 37 | PERp1 |
| 34 | N/C | 35 | PERn1 |
| 32 | N/C | 33 | GND |
| 30 | N/C | 31 | PETp1 |
| 28 | PWDIS | 29 | PETn1 |
| 26 | GND | 27 | GND |
| 24 | N/C | 25 | PERp2 |
| 22 | N/C | 23 | PERn2 |
| 20 | GND | 21 | GND |
| 18 | 3.3V | 19 | PETp2 |
| 16 | 3.3V | 17 | PETn2 |
| 14 | 3.3V | 15 | GND |
| 12 | 3.3V | 13 | PERp3 |
| 10 | LED1# | 11 | PERn3 |
| 8 | N/C | 9 | GND |
| 6 | PRSNT2# | 7 | PETp3 |
| 4 | 3.3V | 5 | PETn3 |
| 2 | 3.3V | 3 | GND |
| | | 1 | GND |

FIG. 21

| | | | |
|---|---|---|---|
| 74 | N/C | 75 | GND |
| 72 | N/C | 73 | GND |
| 70 | N/C | 71 | GND |
| 68 | SUSCLK(32kHz) | 69 | N/C |
| 66 | | 67 | PRSNT1# |
| 64 | KEY | 65 | |
| 62 | | 63 | KEY |
| 60 | | 61 | |
| 58 | Reserved MFG_CLOCK | 59 | |
| 56 | Reserved MFG_DATA | 57 | GND |
| 54 | PEWAKE# | 55 | REFCLKp |
| 52 | CLKREQ# | 53 | REFCLKn |
| 50 | PERST#0 | 51 | GND |
| 48 | PERST#1 | 49 | PERp0 |
| 46 | DualPortEn# | 47 | PERn0 |
| 44 | ALERT#(0) | 45 | GND |
| 42 | SMB_DATA(I/O)(O/1.8V) | 43 | PETp0 |
| 40 | SMB_CLK(I/O)(O/1.8V) | 41 | PETn0 |
| 38 | N/C | 39 | GND |
| 36 | 12V(Pre-Charge) | 37 | PERp1 |
| 34 | 12V | 35 | PERn1 |
| 32 | 12V | 33 | GND |
| 30 | 12V | 31 | PETp1 |
| 28 | PWDIS | 29 | PETn1 |
| 26 | GND | 27 | GND |
| 24 | REFCLKp1 | 25 | PERp2 |
| 22 | REFCLKn1 | 23 | PERn2 |
| 20 | GND | 21 | GND |
| 18 | N/C | 19 | PETp2 |
| 16 | N/C | 17 | PETn2 |
| 14 | N/C | 15 | GND |
| 12 | 3.3V | 13 | PERp3 |
| 10 | LED1# | 11 | PERn3 |
| 8 | N/C | 9 | GND |
| 6 | PRSNT2# | 7 | PETp3 |
| 4 | N/C | 5 | PETn3 |
| 2 | N/C | 3 | GND |
| | | 1 | GND |

FIG. 22

| | | | |
|---|---|---|---|
| 74 | 3.3V | 75 | GND |
| 72 | 3.3V | 73 | GND |
| 70 | 3.3V | 71 | GND |
| 68 | SUSCLK(32kHz) | 69 | N/C |
| 66 | | 67 | PRSNT1# |
| 64 | | 65 | |
| 62 | | 63 | |
| 60 | | 61 | |
|    | | 59 | |
| 58 | Reserved MFG_CLOCK | 57 | GND |
| 56 | Reserved MFG_DATA | 55 | REFCLKp |
| 54 | PEWAKE# | 53 | REFCLKn |
| 52 | CLKREQ# | 51 | GND |
| 50 | PERST#0 | 49 | PERp0 |
| 48 | PERST#1 | 47 | PERn0 |
| 46 | DualPortEn# | 45 | GND |
| 44 | ALERT#(O) | 43 | PETp0 |
| 42 | SMB_DATA(I/O)(O/1.8V) | 41 | PETn0 |
| 40 | SMB_CLK(I/O)(O/1.8V) | 39 | GND |
| 38 | N/C | 37 | PERp1 |
| 36 | N/C | 35 | PERn1 |
| 34 | N/C | 33 | GND |
| 32 | N/C | 31 | PETp1 |
| 30 | N/C | 29 | PETn1 |
| 28 | PWDIS | 27 | GND |
| 26 | GND | 25 | PERp2 |
| 24 | REFCLKp1 | 23 | PERn2 |
| 22 | REFCLKn1 | 21 | GND |
| 20 | GND | 19 | PETp2 |
| 18 | 3.3V | 17 | PETn2 |
| 16 | 3.3V | 15 | GND |
| 14 | 3.3V | 13 | PERp3 |
| 12 | 3.3V | 11 | PERn3 |
| 10 | LED1# | 9 | GND |
| 8 | N/C | 7 | PETp3 |
| 6 | PRSNT2# | 5 | PETn3 |
| 4 | 3.3V | 3 | GND |
| 2 | 3.3V | 1 | GND |

KEY: pins 60, 62, 64, 66 (left) and 59, 61, 63, 65 (right)

FIG. 24

| | | | |
|---|---|---|---|
| 74 | N/C(or 3.3V) | 75 | GND |
| 72 | N/C(or 3.3V) | 73 | GND |
| 70 | N/C(or 3.3V) | 71 | GND |
| 68 | SUSCLK(32kHz) | 69 | PEDET | NC |
| 66 | KEY | 67 | PRSNT# |
| 64 | | 65 | |
| 62 | | 63 | |
| 60 | | 61 | |
| | | 59 | |
| 58 | Reserved MFG_CLOCK | 57 | GND |
| 56 | Reserved MFG_DATA | 55 | N/C | REFCLKp |
| 54 | N/C | PEWAKE# | 53 | N/C | REFCLKn |
| 52 | N/C | CLKREQ# | 51 | GND |
| 50 | N/C | PERST#0 | 49 | SATA-A+ | PERp0 |
| 48 | | 47 | SATA-A- | PERn0 |
| 46 | | 45 | GND |
| 44 | N/C | ALERT#(0) | 43 | SATA-B+ | PETp0 |
| 42 | SMB_DATA(I/O)(0/1.8V) | 41 | SATA-B- | PETn0 |
| 40 | SMB_CLK(I/O)(0/1.8V) | 39 | GND |
| 38 | DEVSLP/PWDIS | NC | 37 | N/C | PERp1 |
| 36 | | 35 | N/C | PERn1 |
| 34 | | 33 | GND |
| 32 | | 31 | N/C | PETp1 |
| 30 | | 29 | N/C | PETn1 |
| 28 | | 27 | GND |
| 26 | | 25 | N/C | PERp2 |
| 24 | | 23 | N/C | PERn2 |
| 22 | | 21 | GND |
| 20 | | 19 | N/C | PETp2 |
| 18 | N/C(or 3.3V) | 17 | N/C | PETn2 |
| 16 | N/C(or 3.3V) | 15 | GND |
| 14 | N/C(or 3.3V) | 13 | N/C | PERp3 |
| 12 | 3.3V | 11 | N/C | PERn3 |
| 10 | DAS/DSS#(I/O) | LED1# | 9 | GND |
| 8 | | 7 | N/C | PETp3 |
| 6 | | 5 | N/C | PETn3 |
| 4 | N/C(or 3.3V) | 3 | GND |
| 2 | N/C(or 3.3V) | 1 | GND |

STORAGE DEVICE SUPPORTING MULTIPLE COMMUNICATION TYPES AND OPERATING METHOD THEREOF

CROSS-REFERENCE TO RELATED APPLICATION

This application claims priority from Korean Patent Application No. 10-2017-0021872, filed on Feb. 17, 2017 in the Korean Intellectual Property Office, the disclosures of which are incorporated herein in their entireties by reference.

BACKGROUND

1. Field

Apparatuses and methods consistent with exemplary embodiments relate to a semiconductor device, and in particular, to a storage device and an operating method of the storage device.

2. Description of the Related Art

A storage device refers to a device that stores data under control of a host device such as a computer, a smartphone, a smart pad, etc. The storage device may store data on a magnetic disk (e.g., a hard disk drive (HDD)) or store data on a semiconductor memory, in particular, a nonvolatile memory (e.g., a solid-state drive (SSD) or a memory card).

The nonvolatile memory includes a read-only memory (ROM), a programmable ROM (PROM), an electrically programmable ROM (EPROM), an electrically erasable and programmable ROM (EEPROM), a flash memory device, a phase-change random access memory (PRAM), a magnetic RAM (MRAM), a resistive RAM (RRAM), a ferroelectric RAM (FRAM), etc.

The storage device with nonvolatile memory has wide applications ranging from a personal computer to an enterprise computer such as a data server. Functions and form factors for the storage device adapted to various fields of application are continuing to diversify with wider adoption of the technology.

SUMMARY

One or more exemplary embodiments provide a storage device that connects to a server needs and an operating method thereof.

According to an aspect of an exemplary embodiment, a storage device includes nonvolatile memory devices, a connector that includes connection terminals, and a controller that communicates with an external host device through the connector and to control the nonvolatile memory devices. The connector provides the external host device with detection information in response to the connector being connected with the external host device. Power is supplied from the external host device to the controller and the nonvolatile memory devices through the connector in response to the providing of the detection information. The connector provides the external host device with information of a communication type, in which the controller communicates with the external host device, after the power is supplied. The communication type is one of a first communication type and a second communication type. In response to the communication type being the second communication type, the controller configures the connection terminals to correspond to one of a single port and a dual-port based on a signal received from the external host device.

According to an aspect of an exemplary embodiment, a storage device includes nonvolatile memory devices, a connector that includes connection terminals, and a controller that communicates with an external host device through the connector and to control the nonvolatile memory devices. Power is supplied to the controller and the nonvolatile memory devices through the connector in response to the connector being connected with the external host device. After the power is supplied, the connector provides the external host device with detection information and provides the external host device with information of a communication type in which the controller communicates with the external host device. The communication type is one of a first communication type and a second communication type. Based on a first signal received from the external host device, the controller sets a configuration of the connection terminals as one of a single port or a dual-port. The controller resets the configuration of the connection terminals based on a second signal received from the external host device.

According to an aspect of an exemplary embodiment, an operating method of a storage device, which includes nonvolatile memory devices and a controller, includes notifying, by the storage device, an external host device of a hot plug in response to the storage device and the external host device being connected to each other; notifying, by the storage device, the external host device of a communication type of the storage device as one of serial advanced technology attachment (SATA) and peripheral component interconnect express (PCIe). In response to the communication type being the PCIe, further setting the communication type as one of a single port PCIe and a dual-port PCIe based on a signal received from the external host device.

BRIEF DESCRIPTION OF THE FIGURES

The above and/or other aspects will become apparent from the following description with reference to the following figures, wherein like reference numerals refer to like parts throughout the various figures unless otherwise specified, and wherein:

FIG. 2 is a flowchart illustrating an operating method of the storage device according to an exemplary embodiment;

FIG. 3 illustrates an example of connection terminals of a connector of the storage device;

FIG. 4 illustrates an example of the connection terminals used to support a hot plug;

FIG. 6 is a view for describing power modes of the storage device;

FIG. 11 illustrates an example of the connection terminals used to support a dual-port and a single port;

FIG. 13 is a flowchart illustrating an example in which dual-port setting is changed;

FIG. 14 illustrates an example of the connection terminals used to support a power reset;

FIG. 17 illustrates an example of the connection terminals when the storage device of the SATA communication type is in a first power mode;

FIG. 18 illustrates an example of the connection terminals when the storage device of the SATA communication type is in a second power mode;

FIG. 19 illustrates an example of the connection terminals when the storage device of the PCIe communication type has a configuration of the single port in the first power mode;

FIG. 20 illustrates an example of the connection terminals when the storage device of the PCIe communication type has a configuration of the single port in the second power mode;

FIG. 21 illustrates an example of the connection terminals when the storage device of the PCIe communication type has a configuration of the dual-port in the first power mode;

FIG. 22 illustrates an example of the connection terminals when the storage device of the PCIe communication type has a configuration of the dual-port in the second power mode;

FIG. 24 illustrates an example of the connection terminals used to support the hot plug.

DETAILED DESCRIPTION

Figure 1:
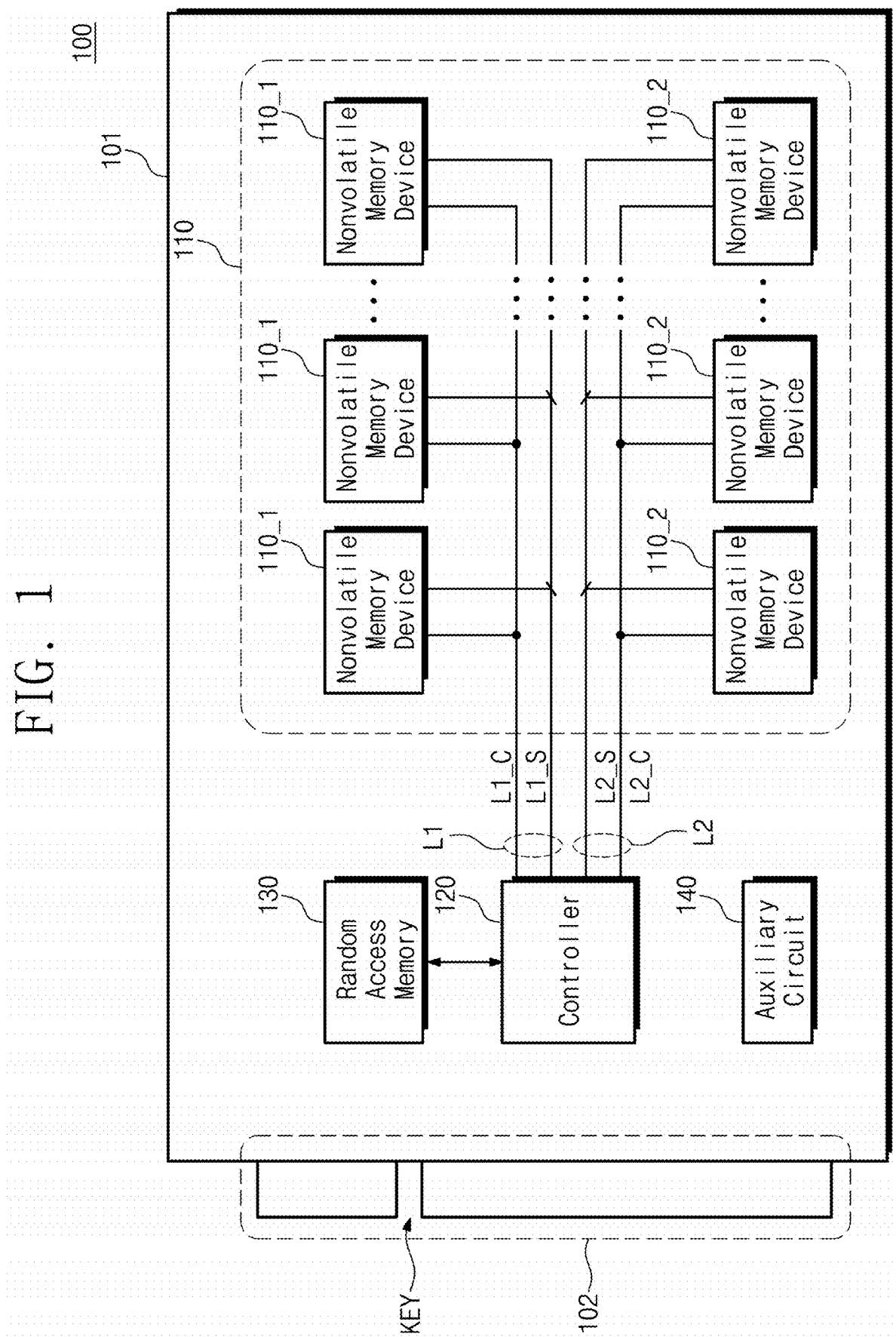
FIG. 1 is a block diagram illustrating a storage device according to an exemplary embodiment.

Reference will now be made in detail to exemplary embodiments with reference to accompanying drawings. In the drawings, parts irrelevant to the description are omitted to clearly describe the exemplary embodiments, and like reference numerals refer to like elements throughout the specification. In this regard, the present exemplary embodiments may have different forms and should not be construed as being limited to the descriptions set forth herein.

It will be apparent that though the terms first, second, third, etc. may be used herein to describe various members, components, regions, layers, and/or sections, these members, components, regions, layers, and/or sections should not be limited by these terms. These terms are only used to distinguish one member, component, region, layer, or section from another region, layer, or section unless otherwise noted such as with specific connector terminal numbers in compliance with a Peripheral Component Interconnect Express (PCIe) M.2 standard. Thus, a first member, component, region, layer, or section discussed below could be termed a second member, component, region, layer, or section without departing from the teachings of the example embodiments.

FIG. 1 is a block diagram illustrating a storage device 100 according to an exemplary embodiment. Referring to FIG. 1, the storage device 100 includes a printed circuit board 101, a connector 102, a nonvolatile storage unit 110, a controller 120, a random access memory 130, and an auxiliary circuit 140.

The printed circuit board 101 may include an insulating material such as plastic. The printed circuit board 101 may have a structure in which a plurality of insulating layers are stacked. Wires may be disposed on at least one of an upper surface and a lower surface of the printed circuit board 101 and surfaces between the insulating layers. The wires may connect the connector 102, the nonvolatile storage unit 110, the controller 120, the random access memory 130, and the auxiliary circuit 140. To prevent a drawing from becoming complicated, not all the wires are illustrated in detail, and first lines L1 and second lines L2 are conceptually illustrated as some of the wires.

The connector 102 may provide connection between the storage device 100 and an external host device. The connector 102 may include the same material as the printed circuit board 101 and may be formed as a protrusion from the printed circuit board 101. Connection terminals may be disposed on at least one of a top surface and a bottom surface of the connector 102. The connection terminals may provide electrical connection between the connector 102 of the storage device 100 and a connector of the external host device. A key "KEY" may be provided in the connector 102. The key "KEY" may prevent the connector 102 from being inserted into a connector of the host device while the connector 102 is turned over.

According to an aspect of an exemplary embodiment, the printed circuit board 101 and the connector 102 may have a structure or form factor complying with the Peripheral Component Interconnect Express (PCIe) M.2 standard.

The nonvolatile storage unit 110, the controller 120, the random access memory 130, and the auxiliary circuit 140 may be provided on at least one of the upper surface and the lower surface of the printed circuit board 101.

The nonvolatile storage unit 110 may include first nonvolatile memory devices 110_1 and second nonvolatile memory devices 110_2. The first nonvolatile memory devices 110_1 are connected with the controller 120 through the first lines L1. The first lines L1 include first common lines L1_C and first separate lines L1_S. The first nonvolatile memory devices 110_1 share the first common lines L1_C. For example, the first common lines L1_C may include input/output lines DQ through which data, commands, and addresses are transferred, and lines through which a write enable signal /WE, a read enable signal /RE, a data strobe signal DQS, a command latch enable signal CLE, address latch enable signal ALE, etc. are transferred. Each of the first nonvolatile memory devices 110_1 is connected with the controller 120 through the corresponding dedicated one of the first separate lines L1_S. The first separate lines L1_S may include lines through which a chip enable signal /CE, a ready and busy signal RnB, etc. are transferred.

The second nonvolatile memory devices 110_2 are connected with the controller 120 through the second lines L2. The second lines L2 include second common lines L2_C and second separate lines L2_S. Descriptions associated with the second common lines L2_C and the second separate lines L2_S are the same as those associated with the first common lines L1_C and the first separate lines L1_S and are thus omitted.

The first nonvolatile memory devices 110_1 constitute a first channel to communicate with the controller 120 through the first lines L1. One of the first nonvolatile memory devices 110_1 may be selected, and the selected nonvolatile memory device may communicate with the controller 120. The remaining nonvolatile memory devices may wait while the selected nonvolatile memory device communicates with the controller 120. The first nonvolatile memory devices 110_1 that are alternately accessed by the controller 120 may be called "ways."

The second nonvolatile memory devices 110_2 constitute a second channel to communicate with the controller 120 through the second lines L2. The second channel may be controlled by the controller 120 independently of the first channel.

The controller 120 may receive a write request, a read request, or an erase request from the external host device through the connector 102. The controller 120 may control the nonvolatile storage unit 110 and the random access memory 130 depending on a request from the external host device or a schedule (e.g., a scheduled operation) planned by an internal background operation. The controller 120 may store write data from the external host device in the random access memory 130. The controller 120 may write the write data stored in the random access memory 130 in the nonvolatile storage unit 110. The controller 120 may read data from the nonvolatile storage unit 110 and may store the read data in the random access memory 130. The controller 120 may rewrite the data stored in the random access memory 130 in another location (e.g., a storage space at another address) of the nonvolatile storage unit 110 or may output the data stored in the random access memory 130 to the external host device. The controller 120 may erase a selected storage space of the nonvolatile storage unit 110.

The controller 120 may load and drive various metadata, which are needed to manage the storage device 100, on the random access memory 130 or an internal memory of the controller 120. The controller 120 may load and drive mapping information between logical addresses of the external host device and physical addresses of the nonvolatile storage unit 110 on the random access memory 130 or an internal memory.

The random access memory 130 may include a dynamic random access memory (DRAM), a static RAM (SRAM), a PRAM, an MRAM, an FRAM, an RRAM, etc. The random access memory 130 may be used as a working memory (also known as main memory, primary memory, etc.) of the controller 120. The random access memory 130 may be used as a buffer memory when the controller 120 communicates with the external host device.

The random access memory 130 may be excluded from the storage device 100. When the random access memory 130 is excluded, various functions described with reference to the random access memory 130 may be executed by the internal memory of the controller 120.

The auxiliary circuit 140 may manage information needed for the external host device to manage the storage device 100 and may provide the information to the external host device. For example, the auxiliary circuit 140 may manage temperature information, a device identifier, etc. of the storage device 100. The auxiliary circuit 140 may provide the temperature information, the device identifier, etc. to the external host device in response to a request from the external host device.

The auxiliary circuit 140 may use power that is independent from power supplied to the nonvolatile storage unit 110, the controller 120, and the random access memory 130. For example, first power that is supplied through a first power terminal or first power terminals of the connector 102 may be provided to the nonvolatile storage unit 110, the controller 120, and the random access memory 130. Second power that is supplied through a second power terminal or second power terminals of the connector 102 may be provided to the auxiliary circuit 140. Even when the nonvolatile storage unit 110, the controller 120, and the random access memory 130 enter a power saving mode, the auxiliary circuit 140 may not enter the power saving mode because the auxiliary circuit 140 uses separate power.

The auxiliary circuit 140 may use input/output terminals that are separated from the controller 120. For example, the controller 120 may communicate with the external host device through first input/output terminals, and the auxiliary circuit 140 may communicate with the external host device through second input/output terminals.

The storage device 100 may support a hot plug, multiple communication protocols, and a dual-port. For example, the hot plug, the multiple communication protocols, and the dual-port may be implemented by the connector 102, the controller 120, or a combination of the connector 102 and the controller 120.

The first nonvolatile memory devices 110_1 and the second nonvolatile memory devices 110_2, the controller 120, the random access memory 130, and the auxiliary circuit 140 may be implemented with one or more packages, and the one or more packages may be disposed on the upper surface or the lower surface of the printed circuit board 101. One package may include a homogeneous block or homogeneous blocks (e.g., the nonvolatile memory devices 110_1 or 110_2, the controller 120, the random access memory 130, and the auxiliary circuit 140). As another example, one package may include heterogeneous blocks (e.g., a combination of two or more different blocks selected from the nonvolatile memory devices 110_1 or 110_2, the controller 120, the random access memory 130, or the auxiliary circuit 140).

FIG. 2 is a flowchart illustrating an operating method of the storage device 100 according to an exemplary embodiment. Referring to FIGS. 1 and 2, in operation S110, as the connector 102 is attached to a connector of the external host device, the storage device 100 may provide the external host device with detection information. If the storage device 100 provides the detection information, the external host device may detect hot plugging (e.g., connecting the storage device 100 to the external host device without stopping or shutting down the external host device first; also known as hot swapping) of the storage device 100.

In operation S120, the storage device 100 may be supplied with power from the external host device. In operation S130, the storage device 100 may provide information of a communication type to the external host device by using the supplied power. For example, the communication type may be Serial Advanced Technology Attachment (SATA) or PCIe.

In operation S140, the storage device 100 may establish a communication link with the external host device based on the information of the communication type. For example, in the case where the communication type of the storage device 100 is SATA, the controller 120 and the external host device may use (e.g., configure) the connection terminals of the connector 102 according to the SATA standard. For example, a link between the connection terminals of the connector 102 and the controller 120 may be established according to the SATA standard, and the external host device may use (e.g., direct. configure, or identify) the connection terminals of the connector 102 or the external host device according to the SATA standard.

In the case where the communication type of the storage device 100 is PCIe, the controller 120 and the external host device may use the connection terminals of the connector 102 according to the PCIe standard. For example, a link between the connection terminals of the connector 102 and the controller 120 may be established according to the PCIe standard, and the external host device may use (e.g., direct, configure, or identify) the connection terminals of the connector 102 or the external host device according to the PCIe standard. For another example, the controller 120 may support both the SATA and the PCIe and may use (e.g., direct, configure) the connection terminals of the connector 102 based on external control (e.g., adjustment of a physical switch) that makes a selection between the SATA and the PCIe.

The connector 102 may be configured to support two or more communication protocols such as the SATA and the PCIe. The storage device 100 may be configured to support one of multiple communication protocols, such as the PCIe and the SATA, by using the same configuration (or form factor) of the connector 102.

FIG. 3 illustrates an example of connection terminals of the connector 102 of the storage device 100. Referring to FIGS. 1 and 3, 1st through 75th connection terminals are illustrated. According to an aspect of an exemplary embodiment, odd-numbered connection terminals may be disposed on an upper surface (or lower surface) of the connector 102, and even-numbered connection terminals may be disposed on the lower surface (or upper surface) of the connector 102.

The 1st, 3rd, 9th, 15th, 21st, 27th, 33rd, 39th, 45th, 51st, 57th, 71st, 73rd, and 75th connection terminals 1, 3, 9, 15, 21, 27, 33, 39, 45, 51, 57, 71, 73, and 75 may be configured to receive a ground voltage GND regardless of a communication type of the storage device 100.

On the basis of a power mode, the 2nd, 4th, 14th, 16th, 18th, 70th, 72nd, and 74th connection terminals 2, 4, 14, 16, 18, 70, 72, and 74 may be not connected N/C or may receive power (e.g., 3.3 V). The power mode may be determined according to the communication type of the storage device 100 or regardless of the communication type thereof. The not connected N/C may mean that a connection terminal is not connected with the controller 120 by a physical wire, or may mean that the connection terminal is connected with the controller 120 by a physical wire but the controller 120 does not use the connection terminal. The power mode will be more fully described with reference to FIG. 6.

The 40th and 42nd connection terminals 40 and 42 may form a sideband interface as part of a system management bus SMBus. The 40th connection terminal 40 may receive a clock SMB_CLK of the system management bus SMBus (e.g., from the external host device to the connector 102) or may output the clock SMB_CLK (e.g., from the connector 102 to the external host device) and may transition between 0 V and 1.8 V. The 42nd connection terminal 42 may receive data SMB_DATA of the system management bus SMBus (e.g., from the external host device to the connector 102) or may output the data SMB_DATA (e.g., from the connector 102 to the external host device) and may transition between 0 V and 1.8 V.

The 56th and 58th connection terminals 56 and 58 may be reserved for use during the manufacturing process. The 56th connection terminal 56 may be reserved for data transfer MFG_DATA during manufacturing. The 58th connection terminal 58 may be reserved for clock transfer MFG_CLK during manufacturing. The 56th and 58th connection terminals 56 and 58 may not be used once the manufacturing of the storage device 100 is completed.

The 68th connection terminal 68 is used to receive a suspend clock SUSCLK in a low-power mode. The suspend clock SUSCLK may have a frequency of 32 kHz. Locations of the 59th through 66th connection terminals 59 to 66 may correspond to the key "KEY." Accordingly, the 59th through 66th connection terminals 59 to 66 are not actually provided and are illustrated in FIG. 3 for the purpose of continuous progression of connection terminal numbers.

The 5th connection terminal 5 may be not connected N/C in the SATA communication type and may be used as a third negative transmit terminal PETn3 in the PCIe communication type. The 7th connection terminal 7 may be not connected N/C in the SATA communication type and may be used as a third positive transmit terminal PETp3 in the PCIe communication type. The 11th connection terminal 11 may be not connected N/C in the SATA communication type and may be used as a third negative receive terminal PERn3 in the PCIe communication type. The 13th connection terminal 13 may be not connected N/C in the SATA communication type and may be used as a third positive receive terminal PERp3 in the PCIe communication type.

The 17th connection terminal 17 may be not connected N/C in the SATA communication type and may be used as a second negative transmit terminal PETn2 in the PCIe communication type. The 19th connection terminal 19 may be not connected N/C in the SATA communication type and may be used as a second positive transmit terminal PETp2 in the PCIe communication type. The 23rd connection terminal 23 may be not connected N/C in the SATA communication type and may be used as a second negative receive terminal PERn2 in the PCIe communication type. The 25th connection terminal 25 may be not connected N/C in the SATA communication type and may be used as a second positive receive terminal PERp2 in the PCIe communication type.

The 29th connection terminal 29 may be not connected N/C in the SATA communication type and may be used as a first negative transmit terminal PETn1 in the PCIe communication type. The 31st connection terminal 31 may be not connected N/C in the SATA communication type and may be used as a first positive transmit terminal PETp1 in the PCIe communication type. The 35th connection terminal 35 may be not connected N/C in the SATA communication type and may be used as a first negative receive terminal PERn1 in the PCIe communication type. The 37th connection terminal 37 may be not connected N/C in the SATA communication type and may be used as a first positive receive terminal PERp1 in the PCIe communication type.

The 41st connection terminal 41 may be used as a negative transmit terminal SATA-B− in the SATA communication type and may be used as a 0-th negative transmit terminal PETn0 in the PCIe communication type. The 43rd connection terminal 43 may be used as a positive transmit terminal SATA-B+ in the SATA communication type and may be used as a 0-th positive transmit terminal PETp0 in the PCIe communication type. The 47th connection terminal 47 may be used as a negative receive terminal SATA-A− in the SATA communication type and may be used as a 0-th negative receive terminal PERn0 in the PCIe communication type. The 49th connection terminal 49 may be used as a positive receive terminal SATA-A+ in the SATA communication type and may be used as a 0-th positive receive terminal PERp0 in the PCIe communication type.

The 53rd connection terminal 53 may be not connected N/C in the SATA communication type and may be used to receive a negative reference clock REFCLKn in the PCIe communication type. The 55th connection terminal 55 may be not connected N/C in the SATA communication type and may be used to receive a positive reference clock REFCLKp in the PCIe communication type.

The 10th connection terminal 10 may be used to receive or transmit a DAS (Device Activity Signal) or DSS (Disable Staggered Spinup) signal in the SATA communication type and may be used to transfer a signal LED1# for controlling a light emitting diode in the PCIe communication type. The 38th connection terminal 38 may be used to transmit or receive a device sleep signal DEVSLP or a power disable signal PWDIS in the SATA communication type and may be not connected N/C in the PCIe communication type.

The 44th connection terminal 44 may be not connected N/C in the SATA communication type and may be used to receive or transmit an alert signal ALERT # in the PCIe communication type. The 44th connection terminal 44 may be included in the system management bus SMBus in the PCIe communication type.

The 50th connection terminal 50 may be not connected N/C in the SATA communication type and may be used to receive a reset signal PERST #0 in the PCIe communication type. The 52nd connection terminal 52 may be not connected N/C in the SATA communication type and may be used to transmit or receive a clock request signal CLKREQ # in the PCIe communication type. The 54th connection terminal 54 may be not connected N/C in the SATA communication type and may be used to transmit or receive a wakeup signal PEWAKE # in the PCIe communication type.

The 69th connection terminal 69 may be used to notify the external host device of information about the communication type of the storage device 100. The 69th connection terminal 69 may be connected to a ground node of the storage device 100 in the SATA communication type and may provide a ground voltage to the host device as a notification signal PEDET. The 69th connection terminal 69, in the PCIe communication type, may be not connected N/C or may be floated. That is, the 69th connection terminal 69 may be used for the storage device 100 to support the multiple communication protocols, in detail, to determine whether to use any one of the multiple communication protocols.

According to an aspect of an exemplary embodiment, the 6th, 8th, 20th, 22nd, 24th, 26th, 28th, 30th, 32nd, 34th, 36th, 46th, 48th, and 67th connection terminals 6, 8, 20, 22, 24, 26, 28, 30, 32, 34, 36, 46, 48, and 67 may be used to support the hot plug, to support the dual-port, and to support the power modes. The 6th, 8th, 20th, 22nd, 24th, 26th, 28th, 30th, 32nd, 34th, 36th, 46th, 48th, and 67th connection terminals 6, 8, 20, 22, 24, 26, 28, 30, 32, 34, 36, 46, 48, and 67 will be described more fully below.

In an exemplary embodiment, the external host device connected with the storage device 100 may include a connector including the same connection terminals as illustrated in FIG. 3. Connection terminals of a host side may be referred to as "host connection terminals" and may be marked by similar reference numerals.

FIG. 4 illustrates an example of connection terminals used to support a hot plug. At least one of the 6th, 8th, 20th, 22nd, 24th, 26th, 28th, 30th, 32nd, 34th, 36th, 46th, 48th, and 67th connection terminals 6, 8, 20, 22, 24, 26, 28, 30, 32, 34, 36, 46, 48, and 67 may be used to support the hot plug. In FIG. 4, it is assumed that the 6th and 67th connection terminals 6 and 67 are used to support the hot plug.

The 67th connection terminal 67 may be used to transmit or receive a first detection signal PRSNT1#. The 6th connection terminal 6 may be used to transmit or receive a second detection signal PRSNT2#. The storage device 100 may notify the external host device that the storage device 100 is attached to the external host device, by transmitting (or exchanging) the first detection signal PRSNT1# and the second detection signal PRSNT2# to (with) the external host device. The hot plug of the storage device 100 may be accomplished when the external host device senses attachment of the storage device 100.

Figure 5:
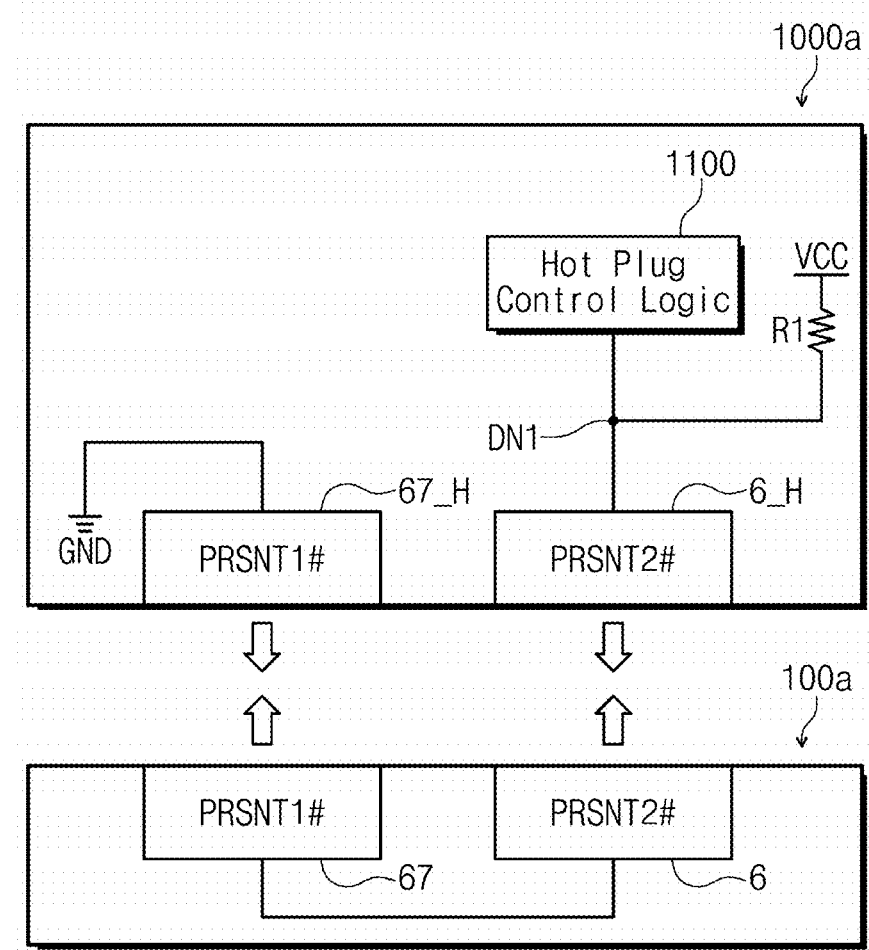
FIG. 5 illustrates an example of conveying first and second detection signals.

FIG. 5 illustrates an example of transmitting the first and second detection signals PRSNT1# and PRSNT2#. In an exemplary embodiment, a configuration of the external host device 1000a associated with the first and second detection signals PRSNT1# and PRSNT2# and a configuration of the storage device 100a associated with the first and second detection signals PRSNT1# and PRSNT2# are illustrated in FIG. 5.

Referring to FIG. 5, the host device 1000a may include hot plug control logic 1100. The hot plug control logic 1100 may be connected to a 6th host connection terminal 6_H of the second detection signal PRSNT2# through a first detection node DN1. The first detection node DN1 may be connected to a power node, to which a power supply voltage VCC is supplied, through a first pull-up resistor R1. A 67th host connection terminal 67_H of the first detection signal PRSNT1# may be connected to a ground node to which the ground voltage GND is supplied.

In the storage device 100a, the 67th connection terminal 67 of the first detection signal PRSNT1# and the 6th connection terminal 6 of the second detection signal PRSNT2# may be connected to each other (e.g., short-circuited). For example, the 6th and 67th connection terminals 6 and 67 may be connected to each other in the printed circuit board 101 (refer to FIG. 1) without connection with the controller 120 (refer to FIG. 1).

When the storage device 100a is not attached to the host device 1000a, a voltage of the first detection node DN1 may be maintained at the power supply voltage VCC by the first pull-up resistor R1. If the storage device 100a is attached to the host device 1000a, the 67th connection terminal 67 corresponding to the first detection terminal PRSNT1# and the 67th host connection terminal 67_H are connected to each other, and the 6th connection terminal 6 corresponding to the second detection signal PRSNT2# and the 6th host connection terminal 6_H are connected to each other.

The ground voltage GND of the ground node of the host device 1000a may be supplied to the first detection node DN1 through the 67th host connection terminal 67_H of the host device 1000a, the 67th connection terminal 67 of the storage device 100a, the 6th connection terminal 6 of the storage device 100a, and the 6th host connection terminal 6_H of the host device 1000a. Accordingly, the voltage of the first detection node DN1 may change from the power supply voltage VCC to the ground voltage GND. The hot plug control logic 1100 may identify the hot plug of the storage device 100a as the voltage of the first detection node DN1 changes.

As described with reference to FIG. 5, the hot plug of the storage device 100a may be detected by using the power supply voltage VCC and the ground voltage GND of the host device 1000a. There is no need for power of the storage device 100a upon detecting the hot plug of the storage device 100a. Since the hot plug is identified even when the power is not supplied to the storage device 100a, the host device 1000a may not need to supply power to connectors (each connector is for attachment of one storage device) where the hot plug is not detected. The host device 1000a may start to supply power to the storage device 100a after the hot plug of the storage device 100a is detected. Accordingly, power consumption of the host device 1000a may be reduced.

FIG. 6 is a view for describing power modes of the storage device 100. Referring to FIGS. 1 and 6, the storage device 100 may have a first power mode and a second power mode. For example, the first power mode may be a 12 V power mode, and the second power mode may be a 3.3 V power mode.

In the first power mode, the 2nd, 4th, 14th, 16th, 18th, 70th, 72nd, and 74th connection terminals 2, 4, 14, 16, 18, 70, 72, and 74 may not be connected N/C. One or more terminals of the 6th, 8th, 20th, 22nd, 24th, 26th, 28th, 30th, 32nd, 34th, 36th, 46th, 48th, and 67th connection terminals 6, 8, 20, 22, 24, 26, 28, 30, 32, 34, 36, 46, 48, and 67 may be used to receive 12 V power (or the ground voltage GND).

In an embodiment, the 30th, 32nd, 34th, and 36th connection terminals 30, 32, 34, and 36 may be used to receive the 12 V power. The 20th and 26th connection terminals 20 and 26 may be used to receive the ground voltage GND. The 12 V power of the 36th connection terminal 36 may be used for precharge. For example, a connector of the host device and the connector 102 of the storage device 100 may be designed such that the 36th connection terminal 36 is connected with the host device prior to the 30th, 32nd, and 34th connection terminals 30, 32, and 34.

If the 36th connection terminal 36 is first connected, the 12 V power received through the 36th connection terminal 36 may be used to precharge an internal circuit (e.g., an internal circuit of the nonvolatile storage unit 110, the controller 120, or the random access memory 130) of the storage device 100. After the storage device 100 is precharged, the 12 V power may be supplied through the 30th, 32nd, and 34th connection terminals 30, 32, and 34. It may be possible to prevent an inrush current supplied to the internal circuit of the storage device 100 from excessively increasing during the hot plug, by using the precharging. In the first power mode, power of 3.3 V may be supplied through the 12th connection terminal 12. The 3.3 V power of the 12th connection terminal may be supplied to the auxiliary circuit 140.

In the second power mode, the 3.3 V power may be supplied through the 2nd, 4th, 12th, 14th, 16th, 18th, 70th, 72nd, and 74th connection terminals 2, 4, 12, 14, 16, 18, 70, 72, and 74. Power supplied through one connection terminal among the 2nd, 4th, 12th, 14th, 16th, 18th, 70th, 72nd, and 74th connection terminals 2, 4, 12, 14, 16, 18, 70, 72, and 74 may be used for precharge, and power supplied through another connection terminal may be supplied to the auxiliary circuit 140. In the second power mode, the 20th, 26th, 30th, 32nd, 34th, and 36th connection terminals 20, 26, 30, 32, 34, and 36 may be not connected (N/C).

The power mode of the storage device 100 may be set in advance or may be set dynamically. For example, in the case where the power mode of the storage device 100 is set to the first power mode (or the second power mode), the connection terminals of the connector 102 and the internal circuit of the storage device 100 may be configured to correspond to the first power mode, and the external host device may use (e.g., direct, configure, or identify) the connection terminals of the connector 102 or the external host device according to the first power mode (or the second power mode).

As another example, the storage device 100 may support both the first power mode and the second power mode and may use (e.g., direct, configure) the connection terminals of the connector 102 and the internal circuit depending on external control (e.g., adjustment of a physical switch) to correspond to one of the first power mode and the second power mode.

Figure 7:
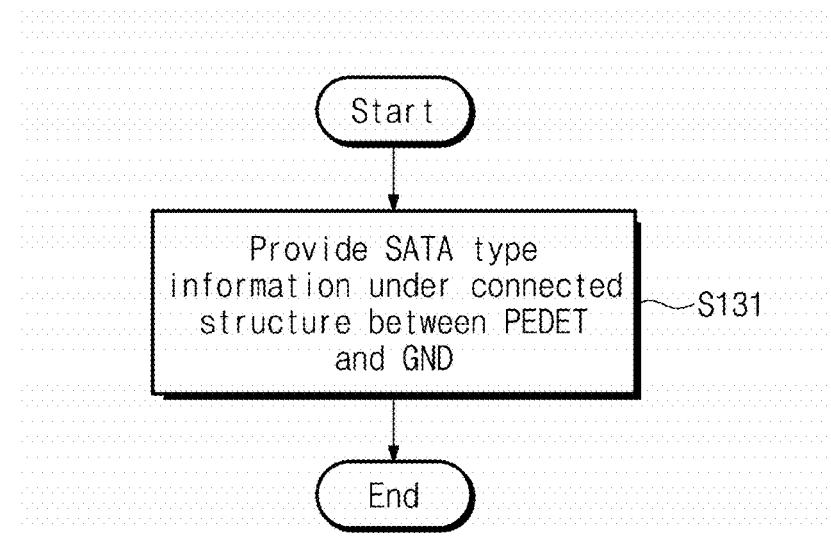
FIG. 7 illustrates an example in which the storage device provides an external host device with information of an SATA communication type.

FIG. 7 illustrates an example in which the storage device 100 provides the external host device with information of the SATA communication type. Referring to FIGS. 1 and 7, in operation S131, the storage device 100 may provide the host device with SATA type information under a structure in which the 69th connection terminal 69 of the notification signal PEDET and a connection terminal of the ground voltage GND are connected to each other.

Figure 8:
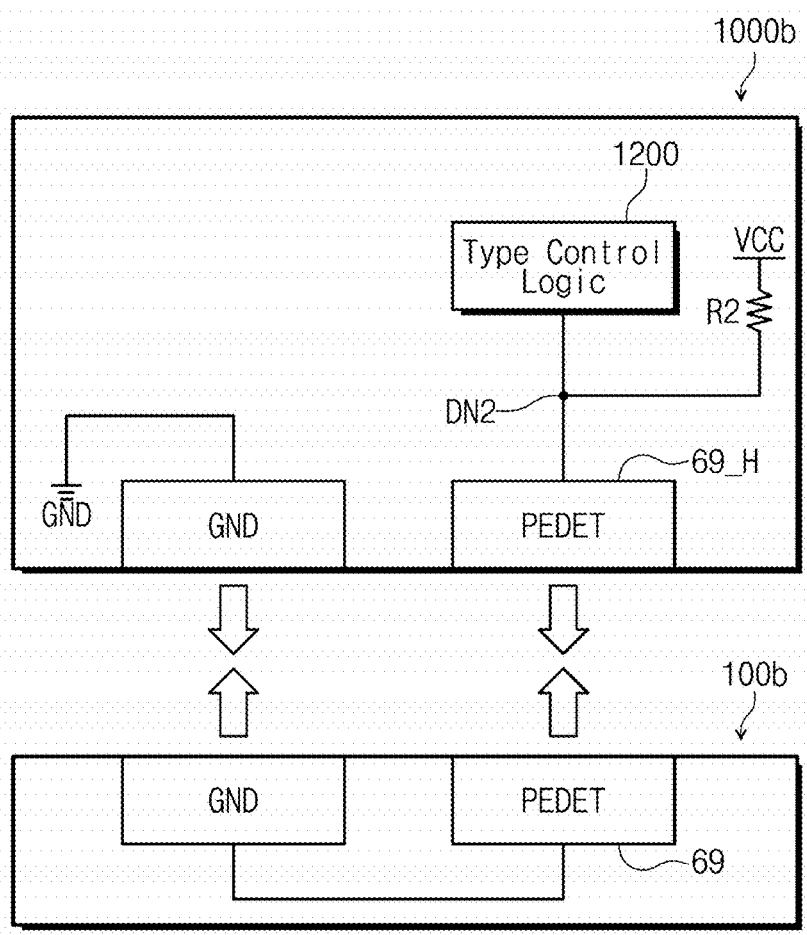
FIG. 8 illustrates an example of a configuration to provide SATA type information.

FIG. 8 illustrates an example of a configuration to provide SATA type information. In an exemplary embodiment, a configuration of an external host device 1000b associated with identifying a communication type and a configuration of a storage device 100b associated with identifying a communication type are illustrated in FIG. 8.

Referring to FIG. 8, the host device 1000b may include type control logic 1200. The type control logic 1200 may be connected to a 69th host connection terminal 69_H of the notification signal PEDET through a second detection node DN2. The second detection node DN2 may be connected to a power node, to which the power supply voltage VCC is supplied, through a second pull-up resistor R2.

The host device 1000b may supply the ground voltage GND to the storage device 100b through connection terminals. For example, as described with reference to FIG. 3, the connection terminals of the ground voltage GND may include the 1st, 3rd, 9th, 15th, 21st, 27th, 33rd, 39th, 45th, 51st, 57th, 71st, 73rd, and 75th connection terminals 1, 3, 9, 15, 21, 27, 33, 39, 45, 51, 57, 71, 73, and 75.

The storage device 100b may supply the ground voltage GND to the 69th connection terminal 69 as the notification signal PEDET. For example, as illustrated in FIG. 8, the 69th connection terminal 69 may be directly connected with one of the connection terminals of the ground voltage GND in the printed circuit board 101 (refer to FIG. 1). As another example, the 69th connection terminal 69 may receive the ground voltage GND from the controller 120 (refer to FIG. 1).

When the storage device 100b is not attached to the host device 1000b, a voltage of the second detection node DN2 may be maintained at the power supply voltage VCC by the second pull-up resistor R2. If the storage device 100b is attached to the host device 1000b, the ground voltage GND of the ground node of the host device 1000b may be supplied to the second detection node DN2 through the connection terminal of the ground voltage GND of the host device 1000b, the connection terminal of the ground voltage GND of the storage device 100b, the 69th connection terminal 69 of the storage device 100b, and the 69th host connection terminal 69_H of the host device 1000b.

Accordingly, the voltage of the second detection node DN2 may change from the power supply voltage VCC to the ground voltage GND. The type control logic 1200 may identify the communication type of the storage device 100b as SATA as the voltage of the second detection node DN2 changes.

Figure 9:
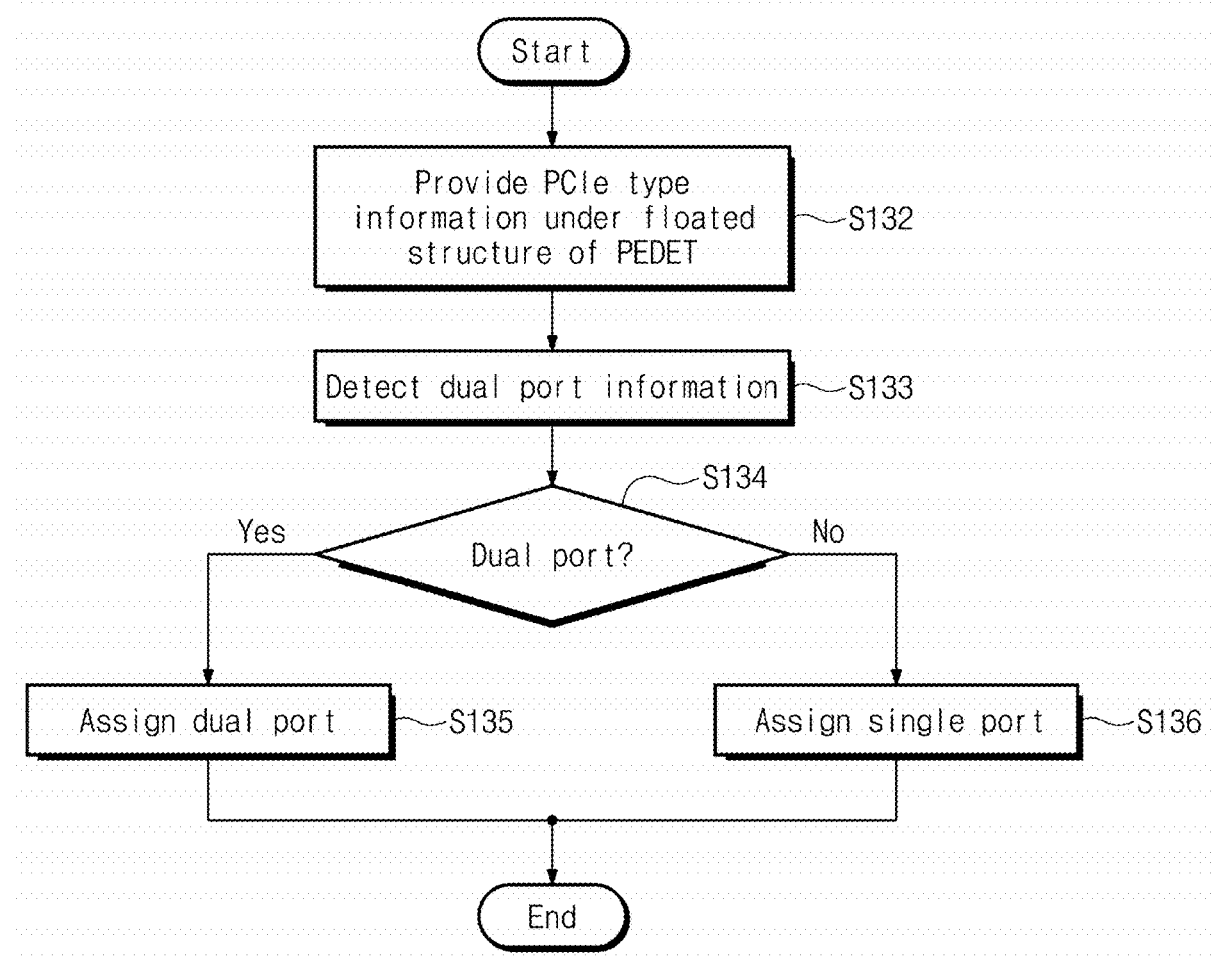
FIG. 9 illustrates an example in which the storage device provides the external host device with information of a PCIe communication type.

FIG. 9 illustrates an example in which the storage device 100 provides the external host device with information of the PCIe communication type. Referring to FIGS. 1 and 9, in operation S132, the storage device 100 may provide the host device with PCIe type information under a structure in which the 69th connection terminal 69 of the notification signal PEDET is floated.

In operation S133, the storage device 100 may detect whether dual-port information is received from the host device. In operation S134, the storage device 100 may determine whether a dual-port is used, based on the dual-port information. If the dual-port is used, in operation S135, the storage device 100 may use (e.g., direct, configure, or identify) the connection terminals of the connector 102 as the dual-port. If the dual-port is not used, in operation S136, the storage device 100 may use (e.g., direct, configure, or identify) the connection terminals of the connector 102 as a single port.

Figure 10:
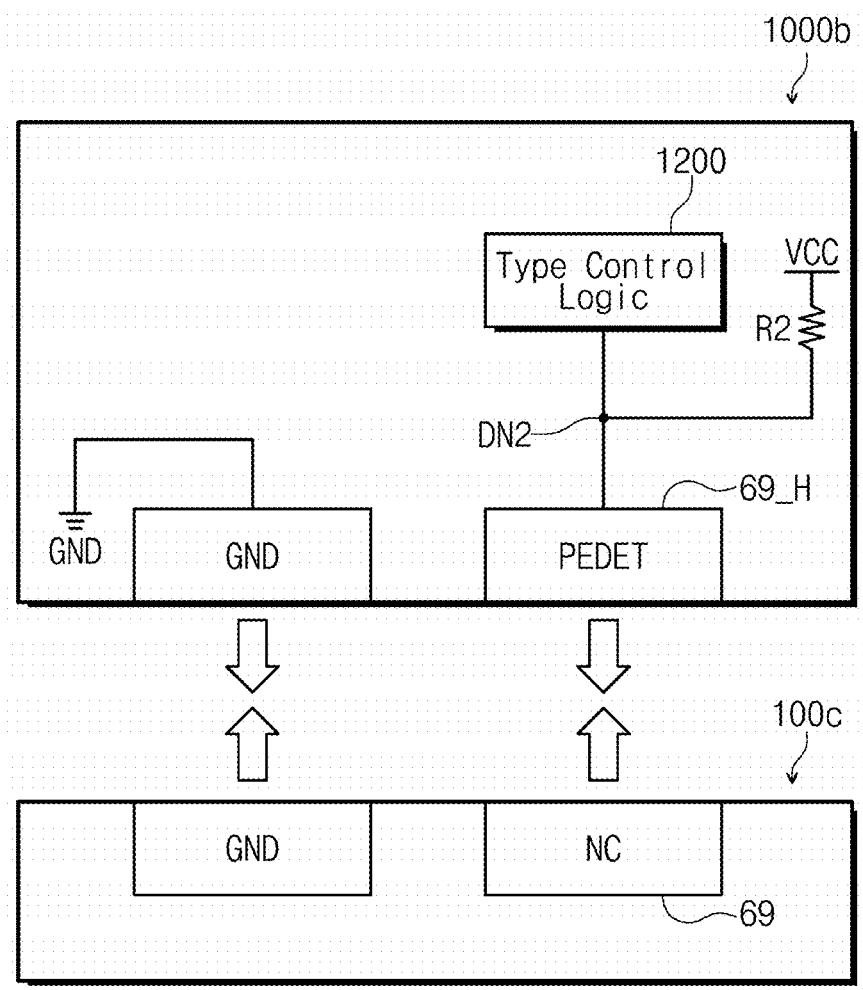
FIG. 10 illustrates an example of a configuration to provide PCIe type information.

FIG. 10 illustrates an example of a configuration to provide PCIe type information. In an embodiment, a configuration of the external host device 1000b associated with identifying a communication type and a configuration of a storage device 100c associated with identifying a communication type are illustrated in FIG. 10. Compared with FIG. 8, the 69th connection terminal 69 of the notification signal PEDET may be floated, not connected with a terminal of the ground voltage GND.

When the storage device 100c is not attached to the host device 1000b, a voltage of the second detection node DN2 may be maintained at the power supply voltage VCC by the second pull-up resistor R2. Even when the storage device 100c is attached to the host device 1000b, a voltage of the second detection node DN2 may be maintained at the power supply voltage VCC. If a voltage of the notification signal PEDET does not change when the hot plug of the storage device 100c is detected, the type control logic 1200 may identify the communication type of the storage device 100c as PCIe.

FIG. 11 illustrates an example of connection terminals used to support a dual-port and a single port. In an exemplary embodiment, one or more terminals of the 6th, 8th, 20th, 22nd, 24th, 26th, 28th, 30th, 32nd, 34th, 36th, 46th, 48th, and 67th connection terminals 6, 8, 20, 22, 24, 26, 28, 30, 32, 34, 36, 46, 48, and 67 may be used to support the dual-port and the single port. In FIG. 11, it is assumed that the 22nd, 24th, 46th, and 48th connection terminals 22, 24, 46, and 48 are used to support the dual-port and the single port. Referring to FIG. 11, in the SATA communication type, the 22nd, 24th, 46th, and 48th connection terminals 22, 24, 46, and 48 may be not connected N/C.

When the single port is selected in the PCIe communication type, the 22nd, 24th, and 46th connection terminals 22, 24, and 46 may be not connected N/C or may not be used. The 5th, 7th, 11th, and 13th connection terminals 5, 7, 11, and 13 may form a third lane of the single port. The 17th, 19th, 23rd, and 25th connection terminals 17, 19, 23, and 25 may form a second lane of the single port. The 29th, 31st, 35th, and 37th connection terminals 29, 31, 35, and 37 may form a first lane of the single port. The 41st, 43rd, 47th, and 49th connection terminals 41, 43, 47, and 49 may form a 0-th lane of the single port. The 53rd and 55th connection terminals 53 and 55 may be used to receive or transmit reference clocks REFCLKn and REFCLKp of the single port, respectively. That is, the storage device 100 may form a single port 4-lane with the connection terminals of the connector 102.

When the dual-port is selected in the PCIe communication type, the 5th, 7th, 11th, and 13th connection terminals 5, 7, 11, and 13 may form a first lane of a first port of the dual-port. The 17th, 19th, 23rd, and 25th connection terminals 17, 19, 23, and 25 may form a 0-th lane of the first port of the dual-port. The 29th, 31st, 35th, and 37th connection terminals 29, 31, 35, and 37 may form a first lane of a 0-th port of the dual-port (also referred to as a second port of the dual-port). The 41st, 43rd, 47th, and 49th connection terminals 41, 43, 47, and 49 may form a 0-th lane of the 0-th port of the dual-port. The 53rd and 55th connection terminals 53 and 55 may be used to receive or transmit the reference clocks REFCLKn and REFCLKp of the 0-th port of the dual-port, respectively. The 22nd and 24th connection terminals 22 and 24 may be used to receive or transmit reference clocks REFCLKn1 and REFCLKp1 of the first port of the dual-port, respectively.

The 46th connection terminal 46 may be used to receive or transmit a dual-port enable signal DualPortEn #. The dual-port enable signal DualPortEn # may include information about whether to select the dual-port or whether to select the single port. The 48th connection terminal 48 may be used to receive or transmit an additional reset signal PERST #1. The additional reset signal PERST #1 may be used to dynamically change the dual-port to the single port or vice versa.

Figure 12:
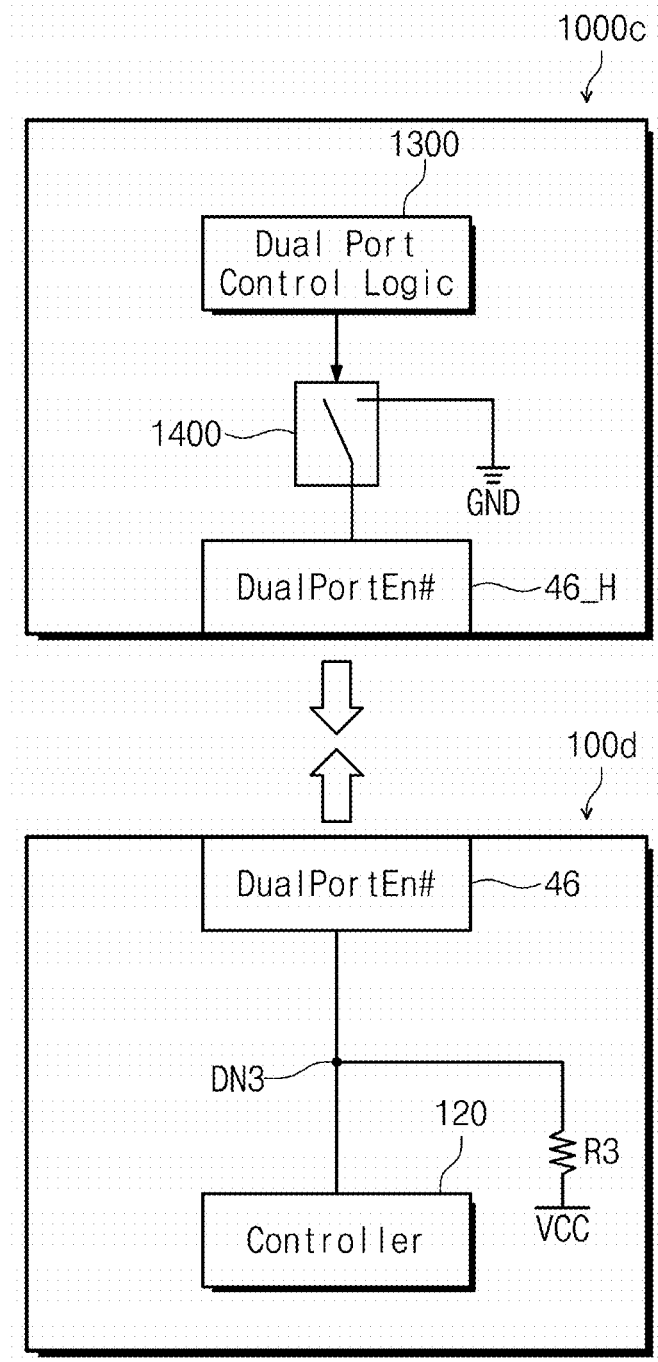
FIG. 12 illustrates an example of a configuration to select the dual-port or the single port.

FIG. 12 illustrates an example of a configuration to select a dual-port or a single port. In an exemplary embodiment, a configuration of an external host device 1000c associated with identifying a communication type and a configuration of a storage device 100d associated with identifying a communication type are illustrated in FIG. 12.

Referring to FIG. 12, the host device 1000c may include dual-port control logic 1300 and a switch 1400. To select the dual-port after attachment of the storage device 100d is detected, the dual-port control logic 1300 may control the switch 1400 such that a 46th host connection terminal 46_H of the dual-port enable signal DualPortEn # is connected to a ground node to which the ground voltage GND is supplied. To select the single port, the dual-port control logic 1300 may control the switch 1400 such that the 46th host connection terminal 46_H of the dual-port enable signal DualPortEn # is floated, not connected to the ground node.

In the storage device 100d, the controller 120 may be connected to the 46th connection terminal of the dual-port enable signal DualPortEn # through a third detection node DN3. The third detection node DN3 may be connected to a power node, to which the power supply voltage VCC is supplied, through a third pull-up resistor R3.

If the host device 1000c supplies the ground voltage GND to the 46th host connection terminal 46_H while the storage device 100d is attached to the host device 1000c, a voltage of the third detection node DN3 may change from the power supply voltage VCC to the ground voltage GND. The controller 120 may select the dual-port when the voltage of the third detection node DN3 changes. As described with reference to FIG. 11, the controller 120 may configure the connection terminals of the connector 102 to correspond to the dual-port.

If the host device 1000c floats the 46th host connection terminal 46_H while the storage device 100d is attached to the host device 1000c, a voltage of the third detection node DN3 may maintain the power supply voltage VCC. The controller 120 may select the single port when the voltage of the third detection node DN3 is maintained. As described with reference to FIG. 11, the controller 120 may configure the connection terminals of the connector 102 to correspond to the single port.

In an exemplary embodiment, the third detection node DN3 and the third pull-up resistor R3 are illustrated in FIG. 12 as being disposed on the outside of the controller 120. However, at least one of the third detection node DN3 and the third pull-up resistor R3 may be disposed inside the controller 120.

In an exemplary embodiment, the power supply voltage VCC supplied to the third pull-up resistor R3 may be a power supply voltage that is directly supplied from the host device 1000c or may be a power supply voltage that the storage device 100d internally generates by using the power supply voltage supplied from the host device 1000c.

FIG. 13 is a flowchart illustrating an exemplary method in which dual-port setting is changed. Referring to FIGS. 11 to 13, in operation S210, the storage device 100 may detect assertion of the reset signal PERST #0 and the additional reset signal PERST #1. For example, the controller 120 may again perform dual-port setting when both the reset signal PERST #0 and the additional reset signal PERST #1 are activated. An operation in which the controller 120 detects assertion of the reset signal PERST #0 and the additional reset signal PERST #1 may be performed by a configuration that is the same as or similar to that described with reference to FIG. 12.

In operation S220, the controller 120 may reset the dual-port setting. In operation S230, the controller 120 may detect deassertion of the reset signal PERST #0 and the additional reset signal PERST #1. In operation S240, the controller 120 may receive dual-port information from the host device 1100c. Operation S240 may be performed according to the structure and method described with reference to FIG. 12.

In operation S250, the storage device 100 may determine whether a dual-port is used, based on the dual-port information. If the dual-port is used, in operation S260, the storage device 100 may assign (or direct or configure) the connection terminals of the connector 102 to correspond to the dual-port. If the dual-port is not used, in operation S270, the storage device 100 may assign (or direct or configure) the connection terminals of the connector 102 to correspond to a single port.

FIG. 14 illustrates an example of connection terminals used to support a power reset. In an exemplary embodiment, at least one of the 6th, 8th, 20th, 22nd, 24th, 26th, 28th, 30th, 32nd, 34th, 36th, 46th, 48th, and 67th connection terminals 6, 8, 20, 22, 24, 26, 28, 30, 32, 34, 36, 46, 48, and 67 may be used to support the power reset. In FIG. 14, it is assumed that the 28th connection terminal 28 is used to support the power reset.

In the SATA communication type, the 28th connection terminal 28 may be not connected N/C. In the SATA communication type, a power disable signal PWDIS may be received through the 38th connection terminal 38. In the PCIe communication type, the 28th connection terminal 28 may be used to receive the power disable signal PWDIS. In the PCIe communication type, the 38th connection terminal 38 may be not connected N/C.

Figure 15:
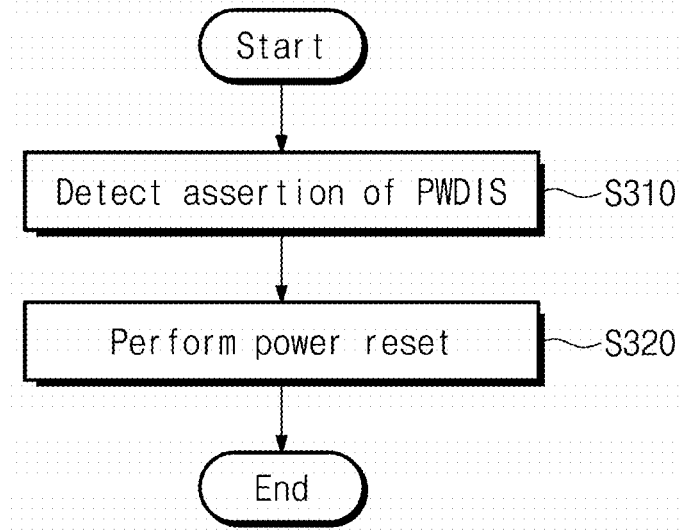
FIG. 15 is a flowchart illustrating an example in which the power reset is performed.

FIG. 15 is a flowchart illustrating an example in which a power reset is performed. Referring to FIGS. 1 and 15, in operation S310, the storage device 100 may detect assertion of the power disable signal PWDIS. If the power disable signal PWDIS is determined as being activated, in operation S320, the storage device 100 may perform the power reset. The power reset may include an operation of blocking power supplied to the nonvolatile storage unit 110, the controller 120, the random access memory 130 for a predetermined time duration, and the auxiliary circuit 140 and resuming supplying of the power later.

In an exemplary embodiment, an error such as device hang may occur while the storage device 100 operates in a state where the storage device 100 is attached to the host device. The error such as device hang may be solved by turning power of the storage device 100 off and then on. If the storage device 100 performs the power reset in response to the power disable signal PWDIS, the storage device 100 may automatically solve the error, such as device hang, by using the power disable signal PWDIS.

Figure 16:
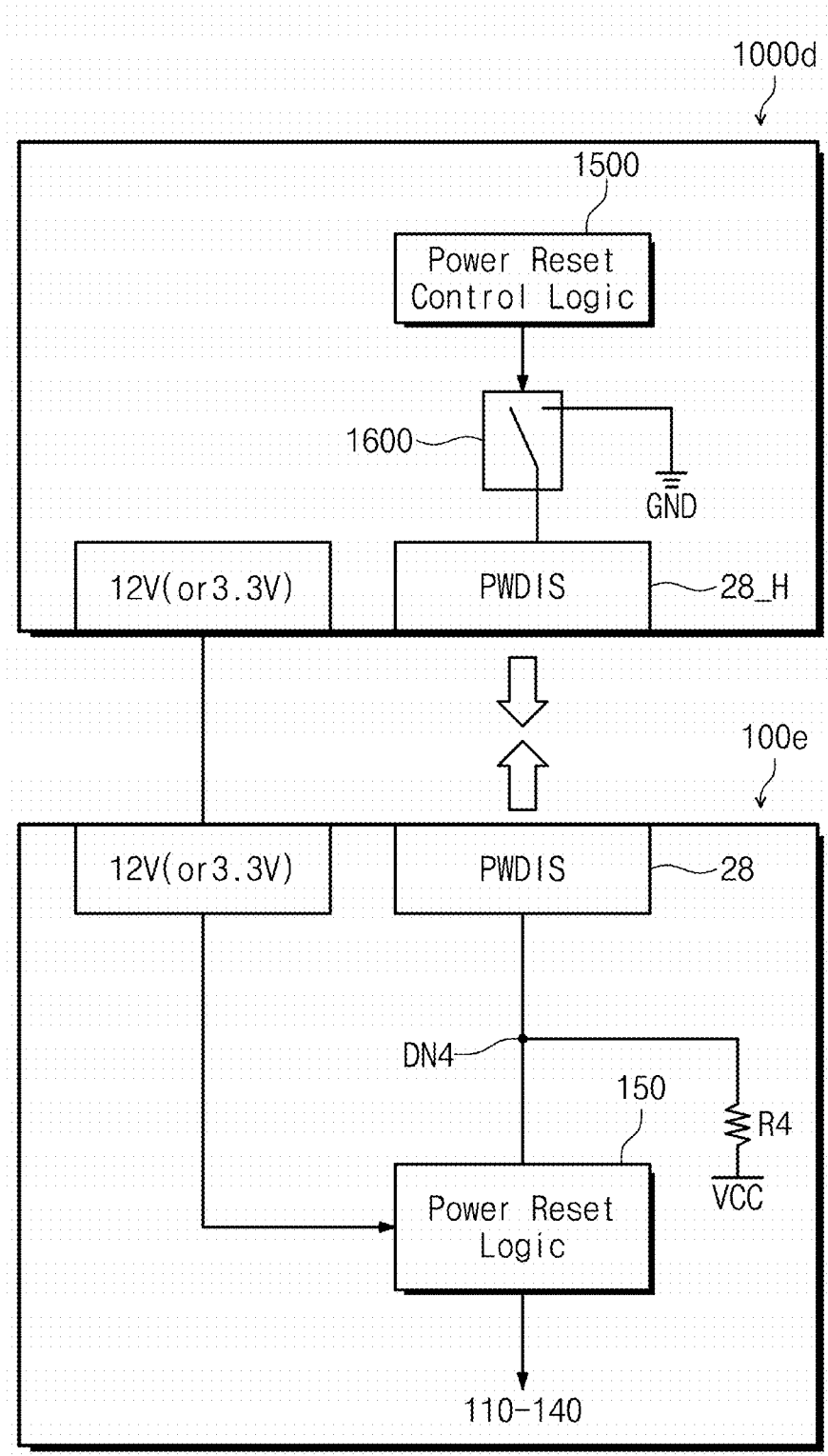
FIG. 16 is a view illustrating a configuration to perform the power reset.

FIG. 16 is a view illustrating a configuration to perform a power reset. A configuration of an external host device 1000d associated with a power reset and a configuration of a storage device 100e associated with the power reset are illustrated in FIG. 16.

Referring to FIG. 16, the host device 1000d may include power reset control logic 1500 and a switch 1600. To perform the power reset, the power reset control logic 1500 controls the switch 1600 such that the ground voltage GND of a ground node is supplied to the 28th host connection terminal 28_H corresponding to the power disable signal PWDIS. When the power reset control logic 1500 does not perform the power reset, the power reset control logic 1500 controls the switch 1600 such that the 28th host connection terminal 28_H corresponding to the power disable signal PWDIS is floated. The host device 1000d may supply power of 12 V or 3.3 V to the storage device 100e through connection terminals.

The storage device 100e includes power reset logic 150. The power reset logic 150 is connected to the 28th connection terminal 28 corresponding to the power disable signal PWDIS through a fourth detection node DN4. The fourth detection node DN4 is connected to a power node, to which the power supply voltage VCC is supplied, through a fourth pull-up resistor R4. Power of 12 V or 3.3 V supplied through connection terminals is supplied to the nonvolatile storage unit 110, the controller 120, the random access memory 130, and the auxiliary circuit 140 through the power reset logic 150.

When the 28th host connection terminal 28_H is floated under control of the power reset control logic 1500 of the host device 1000d, a voltage of the fourth detection node DN4 of the storage device 100e may remain at the power supply voltage VCC. When the ground voltage GND is supplied to the 28th host connection terminal 28_H under control of the power reset control logic 1600 of the host device 1000d, a voltage of the fourth detection node DN4 of the storage device 100e may change from the power supply voltage VCC to the ground voltage GND.

As the voltage of the fourth detection node DN4 changes, the power reset logic 150 may block the power supplied to the nonvolatile storage unit 110, the controller 120, the random access memory 130, and the auxiliary circuit 140 for a predetermined time duration, and may resume supplying of the power after a specific time elapses (refer to FIG. 1). The power of the nonvolatile storage unit 110, the controller 120, the random access memory 130, and the auxiliary circuit 140 may be reset.

The power reset logic 150 may reset the power supplied to the nonvolatile storage unit 110, the controller 120, the random access memory 130, and the auxiliary circuit 140. However, the power reset logic 150 may reset the power of the nonvolatile storage unit 110, the controller 120, and the random access memory 130 except for the auxiliary circuit 140.

In an embodiment, the fourth detection node DN4 and the fourth pull-up resistor R4 are illustrated in FIG. 16 as being disposed on the outside of the power reset logic 150. However, at least one of the fourth detection node DN4 and the fourth pull-up resistor R4 may be disposed inside the power reset logic 150.

An embodiment is exemplified in FIG. 16 as the power reset logic 150 is separated from the controller 120 (refer to FIG. 1). However, the power reset logic 150 may be disposed inside the controller 120.

FIG. 17 illustrates an example of connection terminals when the storage device 100 of the SATA communication type is in the first power mode. Referring to FIG. 17, the 1st, 3rd, 9th, 15th, 20th, 21st, 26th, 27th, 33rd, 39th, 45th, 51st, 57th, 71st, 73rd, and 75th connection terminals 1, 3, 9, 15, 20, 21, 26, 27, 33, 39, 45, 51, 57, 71, 73, and 75 may be configured to receive a ground voltage GND.

The 2nd, 4th, 5th, 7th, 8th, 11th, 13th, 14th, 16th through 19th, 22nd through 25th, 28th, 29th, 31st, 35th, 37th, 44th, 46th, 48th, 50th, 52nd through 55th, 70th, 72nd, and 74th connection terminals 2, 4, 5, 7, 8, 11, 13, 14, 16-19, 22-25, 28, 29, 31, 35, 37, 44, 46, 48, 50, 52-55, 70, 72, and 74 may be not connected N/C.

The 40th connection terminal 40 may be configured to receive or transmit the clock SMB_CLK of the system management bus SMBus. The 42nd connection terminal 42 may be configured to receive or transmit data SMB_DATA of the system management bus SMBus. The 56th connection terminal 56 may be reserved for data transfer MFG_DATA during manufacturing. The 58th connection terminal 58 may be reserved for clock transfer MFG_CLK during manufacturing.

The 68th connection terminal 68 is used to receive a suspend clock SUSCLK in a low-power mode. The suspend clock SUSCLK may have a frequency of 32 kHz. A location where the 59th through 66th connection terminals 59 to 66 are to be disposed corresponds to the key "KEY". Accordingly, the 59th through 66th connection terminals 59 to 66 may not be actually provided.

The 41st connection terminal 41 may be used as a negative transmit terminal SATA-B−. The 43rd connection terminal 43 may be used as a positive transmit terminal SATA-B+. The 47th connection terminal 47 may be used as a negative receive terminal SATA-A−. The 49th connection terminal 49 may be used as a positive receive terminal SATA-A+.

The 10th connection terminal 10 may be used to receive or transmit the DAS or DSS signal. The 38th connection terminal 38 may be used to transmit or receive the device sleep signal DEVSLP or the power disable signal PWDIS. The 69th connection terminal 69 may be used to transmit or receive a notification signal PEDET. The 67th connection terminal 67 may be used to transmit or receive the first detection signal PRSNT1#. The 6th connection terminal 6 may be used to transmit or receive the second detection signal PRSNT2#.

The 12th connection terminal 12 may be used to receive auxiliary power of 3.3 V. The 36th connection terminal 36 may be used to receive precharge power of 12 V. The 30th, 32nd, and 34th connection terminals 30, 32, and 34 may be used to receive the 12 V power.

FIG. 18 illustrates an example of connection terminals when the storage device 100 of the SATA communication type is in the second power mode. Compared with FIG. 17, the 30th, 32nd, 34th, and 36th connection terminals 30, 32, 34, and 36 may be not connected N/C. The 2nd, 4th, 14th, 16th, 18th, 70th, 72nd, and 74th connection terminals 2, 4, 14, 16, 18, 70, 72, and 74 may be used to receive power of 3.3 V. The remaining connection terminals other than the above-described connection terminals are used the same as described with reference to FIG. 17, and a description thereof is thus omitted.

FIG. 19 illustrates an example of connection terminals when the storage device 100 of the PCIe communication type has a configuration of a single port in the first power mode. Referring to FIG. 19, the 1st, 3rd, 9th, 15th, 20th, 21st, 26th, 27th, 33rd, 39th, 45th, 51st, 57th, 71st, 73rd, and 75th connection terminals 1, 3, 9, 15, 20, 21, 26, 27, 33, 39, 45, 51, 57, 71, 73, and 75 may be configured to receive the ground voltage GND.

The 2nd, 4th, 8th, 14th, 16th, 18th, 22nd, 24th, 38th, 69th, 70th, 72nd, and 74th connection terminals 2, 4, 8, 14, 16, 18, 22, 24, 38, 69, 70, 72, and 74 may be not connected N/C or may not be used. The 40th connection terminal 40 may transmit or receive the clock SMB_CLK of the system management bus SMBus. The 42nd connection terminal 42 may transmit or receive data SMB_DATA of the system management bus SMBus.

The 56th connection terminal 56 may be reserved for data transfer MFG_DATA during manufacturing. The 58th connection terminal 58 may be reserved for clock transfer MFG_CLK during manufacturing. The 68th connection terminal 68 is used to receive a suspend clock SUSCLK in a low-power mode. The suspend clock SUSCLK may have a frequency of 32 kHz.

A location where the 59th through 66th connection terminals 59 to 66 are to be disposed corresponds to the key "KEY." Accordingly, the 59th through 66th connection terminals 59 to 66 may not be actually provided. The 5th connection terminal 5 may be used as a third negative transmit terminal PETn3. The 7th connection terminal 7 may be used as a third positive transmit terminal PETp3. The 11th connection terminal 11 may be used as a third negative receive terminal PERn3. The 13th connection terminal 13 may be used as a third positive receive terminal PERp3.

The 17th connection terminal 17 may be used as a second negative transmit terminal PETn2. The 19th connection terminal 19 may be used as a second positive transmit terminal PETp2. The 23rd connection terminal 23 may be used as a second negative receive terminal PERn2. The 25th connection terminal 25 may be used as a second positive receive terminal PERp2.

The 29th connection terminal 29 may be used as a first negative transmit terminal PETn1. The 31st connection terminal 31 may be used as a first positive transmit terminal PETp1. The 35th connection terminal 35 may be used as a first negative receive terminal PERn1. The 37th connection terminal 37 may be used as a first positive receive terminal PERp1.

The 41st connection terminal 41 may be used as a 0-th negative transmit terminal PETn0. The 43rd connection terminal 43 may be used as a 0-th positive transmit terminal PETp0. The 47th connection terminal 47 may be used as a 0-th negative receive terminal PERn0. The 49th connection terminal 49 may be used as a 0-th positive receive terminal PERp0.

The 53rd connection terminal 53 may be used to receive a negative reference clock REFCLKn. The 55th connection terminal 55 may be used to receive a positive reference clock REFCLKp. The 10th connection terminal 10 may be used as a signal LED1# for controlling a light emitting diode. The 44th connection terminal 44 may be used to receive or transmit an alert signal ALERT #. The 28th connection terminal 28 may be used to transmit or receive a power disable signal PWDIS.

The 50th connection terminal 50 may be used to receive a reset signal PERST #0. The 48th connection terminal 48 may be used to receive an additional reset signal PERST #1. The 46th connection terminal 46 may be used to transmit or receive a dual-port enable signal DualPortEn #. The 52nd connection terminal 52 may be used to transmit or receive a clock request signal CLKREQ #. The 54th connection terminal 54 may be used to transmit or receive a wakeup signal PEWAKE #.

The 67th connection terminal 67 may be used to transmit or receive a first detection signal PRSNT1#. The 6th connection terminal 6 may be used to transmit or receive a second detection signal PRSNT2#. The 12th connection terminal may be used to receive auxiliary power of 3.3 V. The 36th connection terminal 36 may be used to receive precharge power of 12 V. The 30th, 32nd, and 34th connection terminals 30, 32, and 34 may be used to receive the 12 V power.

FIG. 20 illustrates an example of connection terminals when the storage device 100 of the PCIe communication type has a configuration of a single port in the second power mode. Compared with FIG. 19, the 30th, 32nd, 34th, and 36th connection terminals 30, 32, 34, and 36 may be not connected N/C. The 2nd, 4th, 14th, 16th, 18th, 70th, 72nd, and 74th connection terminals 2, 4, 14, 16, 18, 70, 72, and 74 may be used to receive power of 3.3 V. The remaining connection terminals other than the above-described connection terminals are used the same as described with reference to FIG. 19, and a description thereof is thus omitted.

FIG. 21 illustrates an example of connection terminals when the storage device 100 of the PCIe communication type has a configuration of a dual-port in the first power mode. Compared with FIG. 19, the 22nd and 24th connection terminals 22 and 24 may be used to receive or transmit additional clocks REFCLKn1 and REFCLKp1 of the dual-port, respectively. The remaining connection terminals other than the above-described connection terminals are used the same as described with reference to FIG. 19, and a description thereof is thus omitted.

FIG. 22 illustrates an example of connection terminals when the storage device 100 of the PCIe communication type has a configuration of a dual-port in the second power mode. Compared with FIG. 20, the 22nd and 24th connection terminals 22 and 24 may be used to receive or transmit additional clocks REFCLKn1 and REFCLKp1 of the dual-port, respectively. The remaining connection terminals other than the above-described connection terminals are used the same as described with reference to FIG. 20, and a description thereof is thus omitted.

Figure 23:
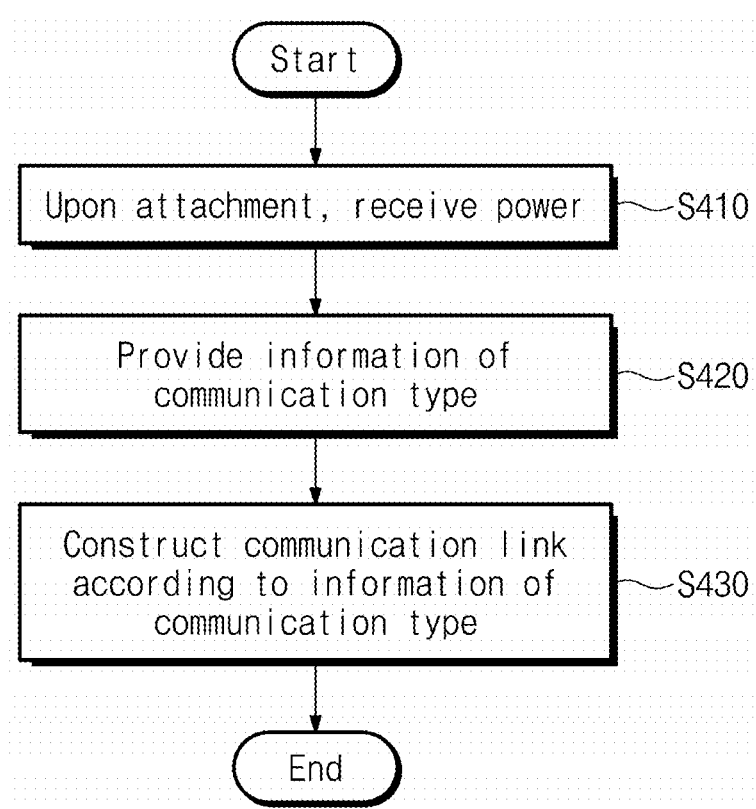
FIG. 23 is a flowchart illustrating an application of an operating method of the storage device according to an embodiment of the inventive concept.

FIG. 23 is a flowchart illustrating an application of an operating method of a storage device 100 according to an embodiment of the inventive concept. Referring to FIGS. 1 and 23, in operation S410, as the connector 102 is connected to a connector of the external host device, the storage device 100 may be provided with power from the external host device. In operation S420, the storage device 100 may provide information of a communication type to the external host device by using the supplied power. For example, the communication type may be SATA or PCIe.

In operation S430, the storage device 100 may construct a communication link with the external host device according to the information of the communication type. For example, in the case where the communication type of the storage device 100 is SATA, the controller 120 and the external host device may configure the connection terminals of the connector 102 according to the SATA standard. In the case where the communication type of the storage device 100 is PCIe, the controller 120 and the external host device may form the connection terminals of the connector 102 so as to correspond to the PCIe standard.

FIG. 24 illustrates an example of connection terminals used to support a hot plug. In an exemplary embodiment, at least one of the 6th, 8th, 20th, 22nd, 24th, 26th, 28th, 30th, 32nd, 34th, 36th, 46th, 48th, and 67th connection terminals 6, 8, 20, 22, 24, 26, 28, 30, 32, 34, 36, 46, 48, and 67 may be used to support the hot plug. In FIG. 24, it is assumed that the 67th connection terminal 67 is used to support the hot plug.

The 67th connection terminal 67 may be used to transmit or receive a detection signal PRSNT #. The storage device 100 may notify the external host device that the storage device 100 is attached to the external host device, by transmitting (or exchanging) the detection signal PRSNT # to (with) the external host device. The hot plug of the storage device 100 may be accomplished when the external host device senses attachment of the storage device 100.

Figure 25:
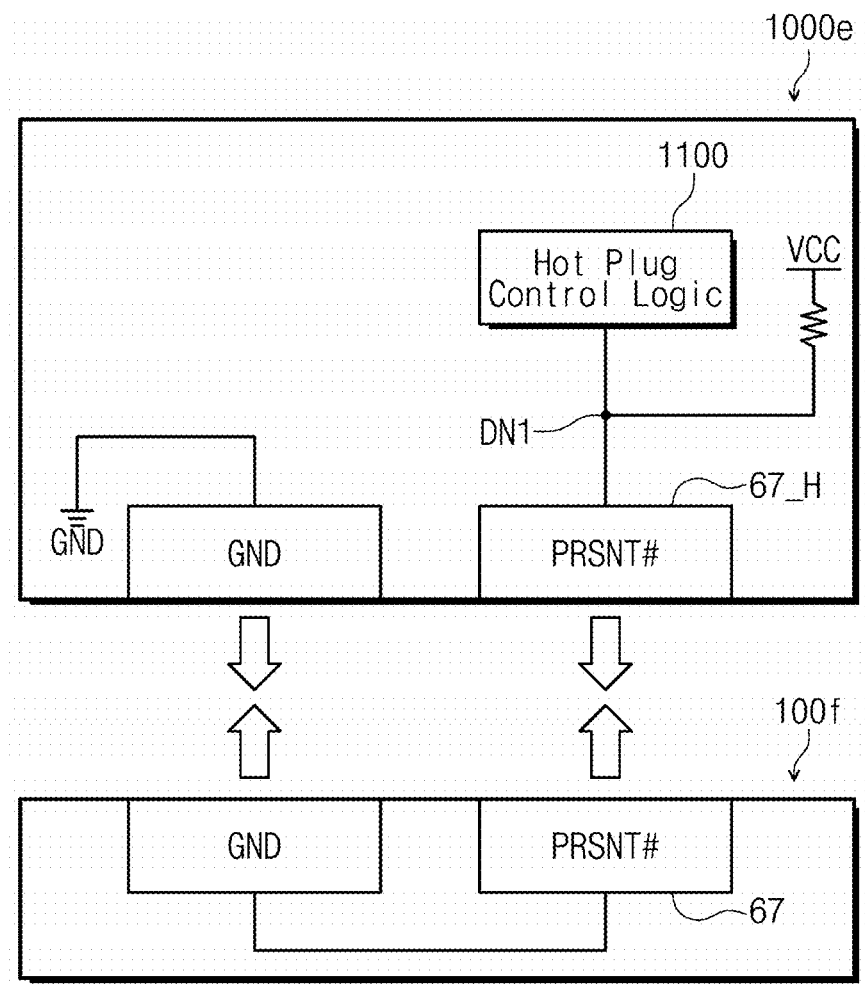
FIG. 25 illustrates an example of conveying a detection signal.

FIG. 25 illustrates an example of transmitting the detection signal PRSNT #. In an embodiment, a configuration of an external host device 1000e associated with the detection signal PRSNT # and a configuration of a storage device 100f associated with the detection signal PRSNT # are illustrated in FIG. 25.

Referring to FIG. 25, the host device 1000e may include the hot plug control logic 1100. The hot plug control logic 1100 may be connected to the 67th host connection terminal 67_H of the detection signal PRSNT # through the first detection node DN1. The first detection node DN1 may be connected to a power node, to which a power supply voltage VCC is supplied, through a first pull-up resistor R1. The host device 1000e may supply the ground voltage GND to the storage device 100f through connection terminals.

In the storage device 100f, the 67th connection terminal 67 of the detection signal PRSNT # may be electrically connected with at least one of connection terminals to which the ground voltage GND is supplied. For example, the 67th connection terminal 67 may be connected with a connection terminal of the ground voltage GND in the printed circuit board 101 (refer to FIG. 1) without connection with the controller 120 (refer to FIG. 1).

When the storage device 100f is not attached to the host device 1000e, a voltage of the first detection node DN1 may be maintained at the power supply voltage VCC by the first pull-up resistor R1. When the storage device 100f is attached to the host device 1000e, the storage device 100f may provide the ground voltage GND from the host device 1000e to the 67th connection terminal 67. Accordingly, the voltage of the first detection node DN1 may change from the power supply voltage VCC to the ground voltage GND. The hot plug control logic 1100 may identify the hot plug of the storage device 100f as the voltage of the first detection node DN1 changes.

According to an exemplary embodiment, there are provided a storage device, which supports a hot plug, multiple communication protocols, and dual-port, and an operating method thereof.

While the disclosure has been described with reference to exemplary embodiments, it will be apparent to those skilled in the art that various changes and modifications may be made without departing from the spirit and scope of the disclosure. Therefore, it should be understood that the above embodiments are not limiting, but illustrative.

What is claimed is:
1. A storage device comprising:
  nonvolatile memory devices;
  a connector including connection terminals; and
  a controller configured to communicate with an external host device through the connector and to control the nonvolatile memory devices,
  wherein the connector provides the external host device with detection information in response to the connector being connected with the external host device, wherein power is supplied from the external host device to the controller and the nonvolatile memory devices through the connector in response to the providing of the detection information, and the connector provides the external host device with information of a communication type in which the controller communicates with the external host device, after the power is supplied, wherein the communication type is one of a first communication type and a second communication type, and wherein, in response to the communication type being the second communication type, the controller configures the connection terminals to correspond to one of a single port and a dual-port based on a signal received from the external host device.

2. The storage device of claim 1, wherein the storage device supports a hot plug by providing the detection information.

3. The storage device of claim 1, wherein the connector provides the detection information based on a structure in which a first connection terminal and a second connection terminal, which are used to detect connection, from among the connection terminals, are short-circuited.

4. The storage device of claim 3, wherein each of the first connection terminal and the second connection terminal corresponds to one of 6th, 8th, 20th, 24th, 26th, 28th, 30th, 32nd, 34th, 36th, 46th, 48th, and 67th connection terminals complying with a peripheral component interconnect express (PCIe) M.2 standard.

5. The storage device of claim 3, wherein the first connection terminal is a 67th connection terminal complying with a PCIe M.2 standard, and the second connection terminal is a 6th connection terminal complying with the PCIe M.2 standard.

6. The storage device of claim 1, wherein the connector notifies the external host device that the communication type is the first communication type, by supplying a ground voltage to a first connection terminal, which is used to detect the communication type, from among the connection terminals, and wherein the first communication type complies with a serial advanced technology attachment (SATA) standard.

7. The storage device of claim 1, wherein the connector notifies the external host device that the communication type is the second communication type, in response to a first connection terminal, which is used to detect the communication type, from among the connection terminals being floated, wherein the second communication type complies with a peripheral component interconnect express (PCIe) standard, and wherein the first connection terminal is a 69th connection terminal complying with a PCIe M.2 standard.

8. The storage device of claim 7, wherein, in response to a voltage of a second connection terminal of the connection terminals being a first level, the controller configures the connection terminals to correspond to the single port and communicates with the external host device through the single port, and wherein the second connection terminal is a 46th connection terminal complying with the PCIe M.2 standard.

9. The storage device of claim 8, wherein, in response to the voltage of the second connection terminal being a second level different from the first level, the controller configures the connection terminals to correspond to the dual-port and communicates with the external host device through the dual-port.

10. The storage device of claim 9, wherein the controller, upon forming the dual-port, assigns a third connection terminal among the connection terminals to a positive additional clock and assigns a fourth connection terminal among the connection terminal to a negative additional clock, configures, from among the connection terminals, a fifth connection terminal and a sixth connection terminal, which are respectively assigned to a positive clock and a negative clock, to correspond to a first port of the dual-port, and configures the third connection terminal and the fourth connection terminal to correspond to a second port of the dual-port, and wherein the third connection terminal is a 22nd terminal complying with the PCIe M.2 standard, and the fourth connection terminal is a 24th connection terminal complying with the PCIe M.2 standard.

11. The storage device of claim 9, wherein, in response to voltages of at least two reset connection terminals among the connection terminals having assertion levels, the controller resets a configuration of the connection terminals and redetects the voltage of the second connection terminal, and wherein the at least two reset connection terminals are 48th and 50th connection terminals complying with the PCIe M.2 standard.

12. The storage device of claim 7, further comprising:

power reset logic connected with power terminals among the connection terminals, the controller, and the nonvolatile memory devices to transfer the power supplied through the power terminals to the controller and the nonvolatile memory devices, wherein, in response to a voltage of a second connection terminal among the connection terminals being changed to an assertion level, the power reset logic blocks the power transferred to the controller and the nonvolatile memory devices for a predetermined time duration, and resumes a transfer of the power to the controller and the nonvolatile memory devices after the predetermined time duration, and wherein the second connection terminal is a 28th connection terminal complying with the PCIe M.2 standard.

13. The storage device of claim 12, wherein the power is 12 V, and the power terminals are 30th through 36th connection terminals complying with the PCIe M.2 standard.

14. The storage device of claim 13, further comprising:

auxiliary logic configured to detect a temperature of the storage device and to output at least one of temperature information and a device identifier of the storage device in response to a request of the external host device, wherein the auxiliary logic is supplied with auxiliary power of 3.3 V through an auxiliary power terminal among the connection terminals, wherein the auxiliary power terminal is a 12th connection terminal complying with the PCIe M.2 standard, wherein the auxiliary logic communicates with the external host device through a third connection terminal and a fourth connection terminal among the connection terminals, and wherein the third connection terminal and the fourth connection terminal are 40th and 42nd connection terminals complying with the PCIe M.2 standard, respectively.

15. The storage device of claim 12, wherein the power is 3.3 V, and the power terminals are 2nd, 4th, 12th, 14th, 16th, 18th, 70th, 72nd, and 74th connection terminals complying with the PCIe M.2 standard.

16. A storage device comprising:
nonvolatile memory devices;
a connector including connection terminals; and
a controller configured to communicate with an external host device through the connector and to control the nonvolatile memory devices,
wherein power is supplied to the controller and the nonvolatile memory devices through the connector in response to the connector being connected with the external host device,
wherein, after the power is supplied, the connector provides the external host device with detection information and provides the external host device with information of a communication type in which the controller communicates with the external host device,
wherein the communication type is one of a first communication type and a second communication type,
wherein, based on a first signal received from the external host device, the controller sets a configuration of the connection terminals as one of a single port or a dual-port, and
wherein the controller resets the configuration of the connection terminals based on a second signal received from the external host device.

17. The storage device of claim 16, wherein the connector provides the detection information by supplying a ground voltage to a first connection terminal, which is used to detect connection, from among the connection terminals.

18. The storage device of claim 16, wherein the first communication type is serial advanced technology attachment (SATA) and the second communication type is peripheral component interconnect express (PCIe).

19. The storage device of claim 16, wherein the controller sets the configuration of the connection terminals as one of a single-port 4-lane PCIe and a dual-port 2-lane PCIe, based on the first signal from the external host device.

20. An operating method of a storage device which comprises nonvolatile memory devices and a controller, the method comprising:
notifying, by the storage device, an external host device of a hot plug in response to the storage device and the external host device being connected to each other;
notifying, by the storage device, the external host device of a communication type of the storage device as one of serial advanced technology attachment (SATA) and peripheral component interconnect express (PCIe); and
in response to the communication type being the PCIe, further setting the communication type as one of a single port PCIe and a dual-port PCIe based on a signal received from the external host device.

* * * * *